United States Patent
Meng et al.

(10) Patent No.: US 12,387,040 B2
(45) Date of Patent: Aug. 12, 2025

(54) MODEL FOR TEXTUAL AND NUMERICAL INFORMATION RETRIEVAL IN DOCUMENTS

(71) Applicant: Bill.com, LLC, Palo Alto, CA (US)

(72) Inventors: Lixin Meng, Cupertino, CA (US); Changlin Zhang, Sunnyvale, CA (US); Sangammohan Harimohan Singh, San Ramon, CA (US)

(73) Assignee: BILL Operations, LLC, San Jose, CA (US)

( * ) Notice: Subject to any disclaimer, the term of this patent is extended or adjusted under 35 U.S.C. 154(b) by 540 days.

(21) Appl. No.: 17/374,373

(22) Filed: Jul. 13, 2021

(65) Prior Publication Data

US 2023/0022845 A1    Jan. 26, 2023

(51) Int. Cl.

| | |
|---|---|
| *G06F 40/279* | (2020.01) |
| *G06F 16/93* | (2019.01) |
| *G06F 40/30* | (2020.01) |
| *G06N 3/08* | (2023.01) |
| *G06F 40/295* | (2020.01) |
| *G06Q 30/04* | (2012.01) |

(52) U.S. Cl.
CPC ............ *G06F 40/279* (2020.01); *G06F 16/93* (2019.01); *G06N 3/08* (2013.01)

(58) Field of Classification Search
CPC ...... G06F 40/279; G06F 16/93; G06F 40/295; G06F 40/30; G06N 3/08; G06N 3/0442; G06N 3/0455; G06N 3/0464; G06Q 30/04; G06Q 40/12
See application file for complete search history.

(56) References Cited

U.S. PATENT DOCUMENTS

| | | | |
|---|---|---|---|
| 2010/0174985 A1* | 7/2010 | Levy ..................... | G06F 40/163 |
| | | | 715/244 |
| 2020/0073882 A1* | 3/2020 | Guggilla .................. | G06N 5/02 |
| 2020/0402049 A1* | 12/2020 | Pi Farias .............. | G06Q 20/208 |
| 2021/0004670 A1* | 1/2021 | Tripathi .................. | G06N 3/084 |
| 2021/0064821 A1 | 3/2021 | Seth et al. | |
| 2021/0081799 A1* | 3/2021 | Johnson .................. | G06F 40/30 |
| 2021/0133439 A1 | 5/2021 | Mehra et al. | |
| 2021/0142164 A1 | 5/2021 | Liu et al. | |

(Continued)

OTHER PUBLICATIONS

R. B. Palm, O. Winther and F. Laws, "CloudScan—A Configuration-Free Invoice Analysis System Using Recurrent Neural Networks," 2017 14th IAPR International Conference on Document Analysis and Recognition (ICDAR), Kyoto, Japan, 2017, pp. 406-413, doi: 10.1109/ICDAR.2017.74. (Year: 2017).*

(Continued)

*Primary Examiner* — Daniel C Washburn
*Assistant Examiner* — Penny L Caudle
(74) *Attorney, Agent, or Firm* — Shook, Hardy & Bacon LLP

(57) ABSTRACT

The accuracy of existing machine learning models, software technologies, and computers are improved by using one or more machine learning models to predict a type of data that one or more numerical characters and/or one or more natural language word characters of a document correspond to. For instance, a Question Answering systems can be used to predict that a particular number value corresponds to a date, a billing amount, a page number, or the like.

20 Claims, 16 Drawing Sheets

(56) References Cited

U.S. PATENT DOCUMENTS

| | | | |
|---|---|---|---|
| 2021/0149993 A1 | 5/2021 | Torres | |
| 2021/0264111 A1* | 8/2021 | Aditya | G06N 3/08 |
| 2021/0406735 A1* | 12/2021 | Nahamoo | G06F 40/247 |
| 2022/0198581 A1* | 6/2022 | Rusu | G06F 40/284 |

OTHER PUBLICATIONS

Doermann, D., et al., "Ch 6: Analysis of the Logical Layout of Documents; Ch 7: Page Similarity and Classification; Ch 10: Machine-Printed Character Recognition", Handbook of Document Image Processing and Recognition, pp. 177-358 (2014).

International Search Report and Written Opinion received for PCT Patent Application No. PCT/US2022/036707, mailed on Oct. 12, 2022, 11 pages.

International Preliminary Report on Patentability received for PCT Patent Application No. PCT/US2022/036707, mailed on Jan. 25, 2024, 7 pages.

Office action received for Canadian Patent Application No. 3225324, mailed on Jan. 14, 2025, 4 pages.

Sanh et al., "DistilBERT, a distilled version of BERT: smaller, faster, cheaper and lighter", Available at : <arXiv:1910.01108v4 [cs.CL] Mar. 1, 2020>, Mar. 1, 2020, 5 pages.

* cited by examiner

| INPUT | [CLS] | bill | to | Stanfrd | Univers | [SEP] | 450 | Serra | Mail | ##ING | [SEP] |
|---|---|---|---|---|---|---|---|---|---|---|---|
| TOKEN EMBEDDINGS | $E_{[CLS]}$ | $E_{bill}$ | $E_{to}$ | $E_{stanfrd}$ | $E_{univers}$ | $E_{[SEP]}$ | $E_{450}$ | $E_{serra}$ | $E_{mail}$ | $E_{\#\#ing}$ | $E_{[SEP]}$ |
| | + | + | + | + | + | + | + | + | + | + | + |
| CONTEXT-QUESTION EMBEDDINGS | $E_A$ | $E_A$ | $E_A$ | $E_A$ | $E_A$ | $E_A$ | $E_B$ | $E_B$ | $E_B$ | $E_B$ | $E_B$ |
| | + | + | + | + | + | + | + | + | + | + | + |
| POSITION EMBEDDINGS | $E_0$ | $E_1$ | $E_2$ | $E_3$ | $E_4$ | $E_5$ | $E_6$ | $E_7$ | $E_8$ | $E_9$ | $E_{10}$ |

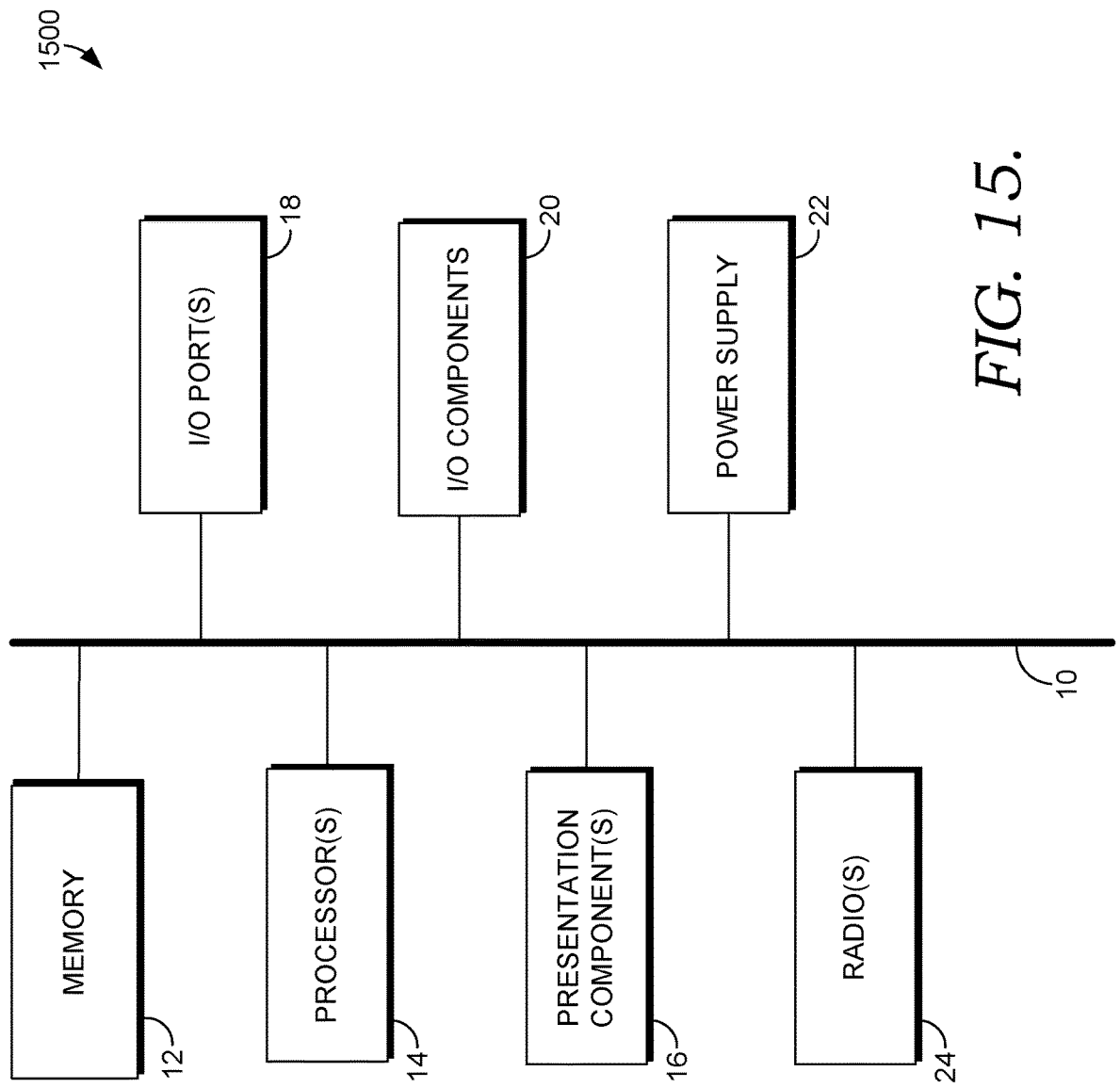

US 12,387,040 B2

MODEL FOR TEXTUAL AND NUMERICAL INFORMATION RETRIEVAL IN DOCUMENTS

BACKGROUND

Existing computer applications and models are configured to process natural language characters in documents (e.g., digital books, letters, etc.). For example, some technologies can use standard natural language processing (NLP) functionality in order to determine the semantic meaning of words in a natural language sentence of a document. However, these existing technologies, such as existing machine learning models, are inaccurate in determining meaning of information in a document, especially when such document contains large percentage of numerical values, does not contain vary many contiguous natural language word characters (e.g., such as in invoices), or is otherwise highly unstructured. These existing technologies also unnecessarily consume computer resources (e.g., memory and latency), among other things.

BRIEF SUMMARY

Particular embodiments of the present disclosure include a computer-implemented method, a non-transitory computer storage medium, and a system. Some aspects are directed to improving the accuracy of existing machine learning models, software technologies, and computer resource consumption by using one or more machine learning models (e.g., a modified transformer) to predict a type of data that one or more numerical characters and/or one or more natural language word characters of a document (e.g., an invoice) correspond to. For example, some embodiments employ Question Answering systems to predict that a particular number value corresponds to a date, a billing amount, a name of business entity, an invoice number, or the like. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 6 is a schematic diagram illustrating in more detail how the inputs of FIG. 5 are processed in pre-training and fine-tuning, according to some embodiments.

FIG. 7 is a screenshot of an example user interface, according to some embodiments.

FIG. 8 is a screenshot of an example user interface, according to some embodiments.

FIG. 15 is a block diagram of a computing device in which aspects of the present disclosure are implemented within, according to some embodiments.

DETAILED DESCRIPTION

Figure 1:
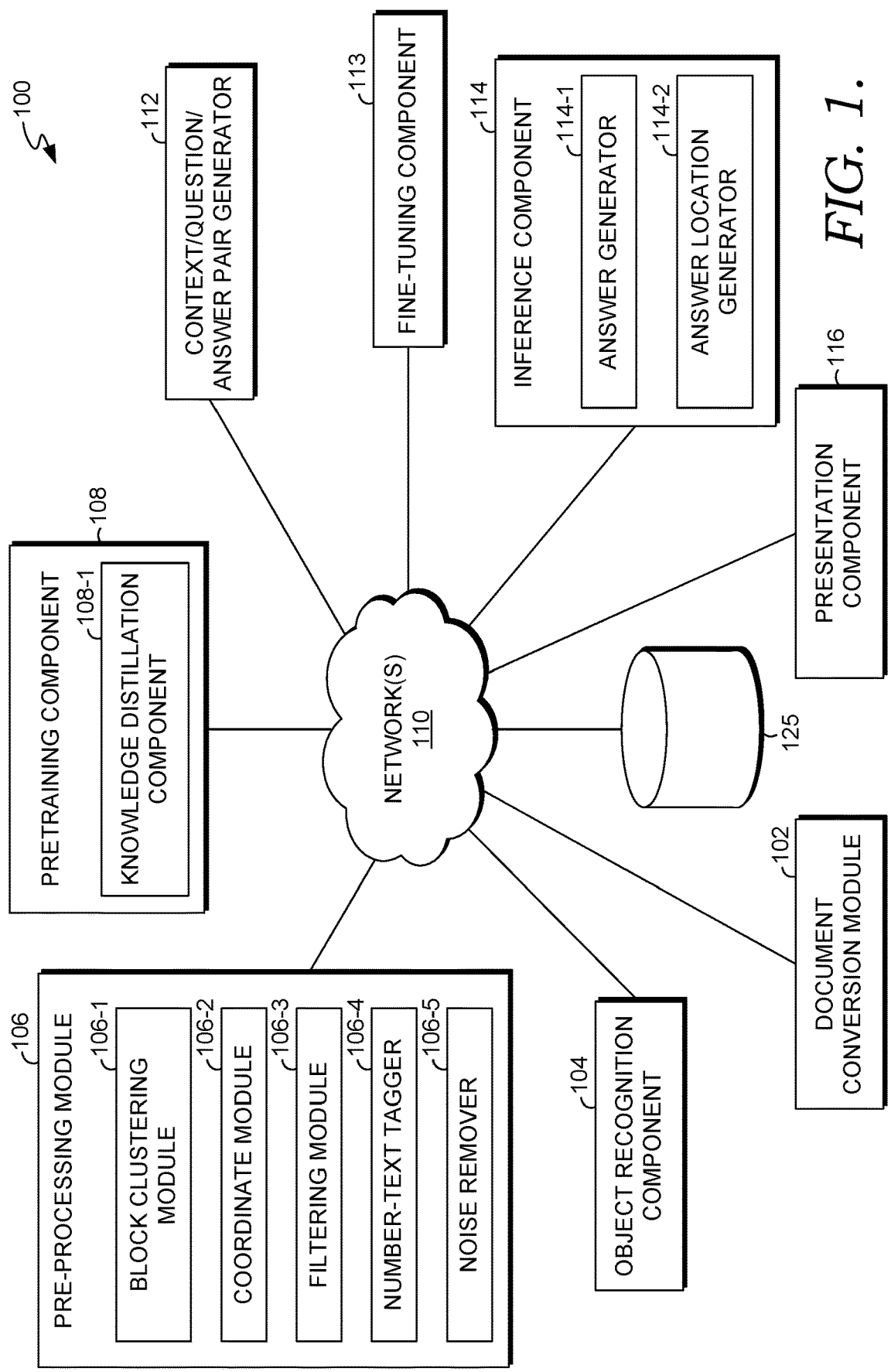
FIG. 1 is a block diagram of an illustrative system architecture, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing computers themselves, machine learning models, software applications (e.g., object character recognition (OCR)), and other technologies that process documents are inaccurate in making predictions associated with documents. For example, existing Recurrent Neural Networks (RNN), such as Long Short Term Memory (LSTM) models, can be used to understand language by sequentially encoding and responsively learning the meaning of words. In other words, LSTM models can be used to learn semantic meaning of words by feeding each word one by one into the model as they appear in a sentence and learning based on previously encoded sequences. For example, for the sentence, "I had an APPLE today instead of my other phone," the first encoded word would be "I," followed by "had," followed by "an" and so on. However, sequential learning based on words previously encoded does not capture true semantic meaning of sentences. For example, LSTM and other models may predict the meaning of APPPLE to be a fruit, instead of a phone based on the previous sequence before the word "APPLE." Had LSTMs or other models taken the other context of the sentence into account in parallel (e.g., "today instead of my other phone"), the models would be more accurate.

Existing models are also inaccurate in extracting numerical information from documents and making predictions associated with the numerical information. Existing technologies, such as LSTMs, Bidirectional Encoder Representations from Transformers (BERT), WORD2VEC models, GloVe models, and other natural language processing-based models all work under the assumption that the documents they process have enough natural language character words to determine meaning. However, these technologies are not configured to understand numbers and how the numbers indicate meaning in a document. Rather, these technologies only extract semantic meaning from words of a document. For example, these technologies use Stemming, Lemmatization, Stop Words Removal, and the like to understand natural language. Each of these computer functionality steps assume that there are enough words to make meaning from a document. However, some documents, such as financial documents (e.g., invoices, bills, and balance sheets) do not contain enough natural language words for this functionality to be useful, and instead contain a large amount of numerical information. Also, entities on financial document generally follow both top-down and left-right reading order or co-exist on the same document, However, traditional NLP methods have been observed not efficient in understanding long sequence or spatial relationships. Accordingly, existing technologies are inaccurate in making predictions (e.g., estimating that a number refers to currency, rather than an invoice date), when documents contain numbers and/or a small quantity of natural language words.

Relatedly, existing models are also inaccurate in processing documents that are highly unstructured or are not in traditional natural language form. For example, such highly unstructured documents may be invoices or other financial documents that contain scattered blocks, charts, graphs, and the like, as opposed to naturally flowing paragraphs and sentences, such as those found in books or letters. Existing technologies, such as LSTMs, BERT models, WORD2VEC models, GloVe models, and other natural language processing-based models are all suited best for documents that have paragraphs and sentences, which makes the documents structured enough for these technologies to understand them (e.g., via stemming, lemmatization, and Part-of-Speech (POS) tagging). However, when there are no sentences or paragraphs, these technologies have difficulty making predictions and determining meaning.

Existing technologies are also deficient in terms of computing resource consumption, such as memory and latency. For example, because LSTMs encode and predict sequentially, it can take a significant amount of time steps before the LSTMs learn. This causes network latency problems, such as completing an HTTP request to predict what type of information a value on a document corresponds to. Further, while NLP-based models (e.g., BERT) have led to significant advances, they often have several hundred million parameters. This trend towards larger models raises several concerns. First is the cost of exponentially scaling these models' computational requirements. Second, these large models require extensive computational and memory requirements. This is because all of these parameters must be stored in memory and analyzed at runtime and training to make predictions, making the overhead extensive and unnecessary. Lastly, there are efficiency costs with training existing models. That is, these models take a vast quantity of time to train and deploy in a production environment. This is because most parameters are learned from scratch, taking many epochs and training sessions.

Various embodiments of the present disclosure provide one or more technical solutions to the technical problems described above, as well as other problems. In operation, various embodiments of the present disclosure are directed to using one or more machine learning models (e.g., a modified transformer) to predict a type of data that one or more numerical characters and/or one or more natural language word characters of a document (e.g., an invoice) correspond to. For example, some embodiments employ Question Answering systems to predict that a particular number value corresponds to a date, a billing amount, a name of business entity, an invoice number, or the like. In Question Answering tasks, models receive a question regarding text content (e.g., what date is the invoice amount due?"), and mark or tag the beginning and end of the answer (e.g., underline the value "$13,500") in a document.

In making these predictions, various embodiments intelligently convert the one or more numerical characters, the one or more natural language word characters, and/or the questions into a feature vector embedding in feature space based at least in part on training one or more machine learning models in order to learn the meaning of words and/or the numbers themselves. For example, some embodiments encode the number $13,500 into two tags—"currency" and the value "thirteen thousand, five hundred." This indicates that the number refers to currency, as opposed to a date, for example. These encoded values are then converted in to a feature vector and embedded in feature space. In this way, these tags can be embedded in feature space using currency to determine its semantic meaning, as opposed to another value, which helps embodiments understand the meaning of numbers.

Some embodiments cause presentation, on a user interface, of an indication of the prediction and/or a spatial location within the document where the prediction is derived from. For example, some embodiments use a computer vision-based machine learning model (e.g., a Convolutional Neural Network (CNN)) to detect objects in a document via a bounding box. A bounding box describes or defines the boundaries of an object (e.g., a word) in terms of the position (e.g., 2-D or 3-D coordinates) of the bounding box (and also the height and width of the bounding box). For example, the bounding box can be a rectangular box that is determined by its x and y axis coordinates, which is formulated over an answer numerical value. In this way, for example, a bounding box can be generated over the numerical value of $13,500 and natural language indicia reading "total invoice value" can be superimposed over the document next to the numerical value. Such natural language indicia may not, for example, be explicitly recited in the original document. Alternatively or additionally, such natural language indicia (or corresponding numerical values) may be used to supplement an additional document or instance, as described in more detail below.

Various embodiments of the present disclosure improve the accuracy of existing technologies. As described above, existing technologies (such as LSTM models) predict and learn semantic meaning of words by feeding each word one by one into the model as they appear in a sentence and learning based on previously encoded sequences. This does not capture the true semantic meaning of sentences. However, particular embodiments of the present disclosure use modified BERT models or modified stacked encoders, which process words or other characters of a block in parallel, which is better able to capture semantic meaning. For example, using the illustration above, for the sentence, "I had an APPLE today instead of my other phone," a modified BERT may process both "APPLE" and "phone" substantially in parallel, thereby allowing the modified BERT model to determine that APPLE is referring to a phone, as opposed to a fruit.

In additional to improving the way models understand and interpreted textual information, particular embodiments further improve the way existing models extract numerical information from documents and make predictions associated with the numerical information. Unlike existing technologies, particular embodiments do not work under the assumption that the documents they process have enough natural language character words to determine meaning. For instance, particular embodiments do not perform stemming, lemmatization, Stop Words Removal and the like, which requires an adequate amount of words and sentences. In various instances, particular financial documents, such as invoices, have very little natural language words and perhaps no sentences. Existing technologies are unable to process or understand numbers in documents. Particular embodiments improve these technologies by generating one or more tags for the one or more numerical characters and then converting those tags into a feature vector embedding to derive meaning. These tags indicate a type or category that a number belongs to. For example, the tokens "total amount due $114.88" would change to "total amount due currency_str_after$114.88." This new "currency" tag indicates that the numerical value of 114.88 corresponds to "currency" as opposed to a date, for example. Accordingly, particular embodiments are more accurate in making predictions, when documents contain numbers and/or a small quantity of natural language words.

Relatedly, particular embodiments improve the way models process documents that are highly unstructured or are not in traditional natural language form. For example, such highly unstructured documents may be invoices or other financial documents that contain scattered blocks, charts, graphs, and the like, as opposed to naturally flowing paragraphs and sentences, such as those found in books or letters. Various embodiments of the present disclosure improve these technologies by performing object detection or other computer-vision functionality to detect instances, such as blocks, within documents in order to make documents more structured before feeding to a machine learning model to determine meaning of the natural language words or numerical characters.

Particular embodiments also improve computing resource consumption, such as memory and latency. As described above, existing LSTMs cause network latency problems and existing BERT models often train on several hundred million parameters, which is costly in terms of computation and memory. Various embodiments of the present disclosure improve these models by employing modified BERT models or encoders, which in some embodiments, are compressed or smaller versions of regular models. For instance, these compressed models can use millions of fewer parameters using knowledge distillation or other functionality, as described in more detail below. Accordingly, because there are substantially less parameters to work from, not as much data is stored to memory and the computational cost (e.g., latency, CPU utilization, etc.) is much lower. Further, these models can be trained and deployed quicker in a production environment because fewer parameters are learned from scratch, taking fewer epochs or training sessions.

FIG. 1 is a block diagram of an illustrative system architecture 100 in which some embodiments of the present technology may be employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 1400 of FIG. 14). In other embodiments, the system 100 is located at a single host or computing device (e.g., the computing device 1500 of FIG. 15). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to predicting a type of data that one or more numerical characters and/or natural language words correspond to, according to some embodiments. The system 100 includes a document conversion module 102, an object recognition component 104, a pre-processing module 106, a pre-training component 108, a context, question, and/or answer pair generator 112, a prediction component 114, a presentation component 116, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 100.

The document conversion module 102 is generally responsible for converting (e.g., via PymuPDF) one or more raw documents into another format in preparation for further processing (e.g., by a machine learning model). For example, the document conversion module 102 may convert any document (e.g., a MICROSOFT WORD document) that is not an image into an image. A "document" as described herein refers to entire object or set of pages that are associated with or belong to a particular event (e.g., a work duty job or series of tasks) or entity (e.g., a company). Each document, however, can have multiple pages. For example, invoice A (which has 5 ages) from Company B can be uploaded and invoice C (which has 10 pages) from company D can be uploaded. In this example, there are only two documents—invoice A and invoice C, even though both have multiple pages.

Often, information is difficult to extract in certain formats (e.g., JPEG) and/or the original formats consume unnecessary computer memory resources. Accordingly, data may be converted from one format to another in order to extract all features of a document, save on memory resources, and the like all while maintaining high image quality. For example, the document conversion module 102 can automatically convert a PDF document of several pages into an image file output format (e.g., .jpg, .png, .bmp, .tiff, etc.), such as via a PDF-to-JPG converter. JPEG, for example, is a file format that can contain image with 4:1 to 10:1 lossy image compression technique via conversion. With this compression technique embodiments can reduce the image size of images contained within PDF documents without losing the image quality.

In some embodiments, the document conversion module 102 additionally or alternatively performs functionality by using an Extract Transform Load (ETL) functionality. ETL refers to the concept of pulling (or copying) data from one or more source databases (e.g., storage 125) and writing the pulled data into a target data store (e.g., a data warehouse). Specifically, for the "Extract" operation, data (e.g., raw data) is extracted or read from one or data sources (e.g., different types of databases). For the "Transform" operation, the read data is converted from its previous form (e.g., raw form) into the form it needs to be in so that it can be placed in another database. Transform occurs by using lookup tables, one or more rules, or combining the read data with other data. In an illustrative example of the Transform operation, several unrelated documents can be joined. In another example, the Transform operation can additionally or alternatively clean, sort, validate, and/or prepare the read data. For the "Load" operation, the transformed data from the "Transform" operation is then written into a target data store. For example, using the illustration above, the joined documents can be output in a single view.

Alternatively or additionally, the document conversion module 102 performs functionality by performing machine learning pre-processing steps on one or more documents, such as data wrangling, data munging, scaling, and the like. Data wrangling and data munging refers to the process of transforming and mapping data from one form (e.g., "raw") into another format to make it more appropriate and useable for downstream processes (e.g., predictions). Scaling (or "feature scaling") is the process of changing number values (e.g., via normalization or standardization) so that a model can better process information. For example, the document conversion module 102 can bind number values between 0 and 1 via normalization. In some embodiments, the output of the document conversion module 102 is an image of a document with a fixed crop ration, pixel per inch (PPi).

The object recognition component 104 is generally responsible for detecting one or more objects and/or characters within one or more documents. In some embodiments, the object recognition component 104 performs its functionality in response to the document conversion module 102 performing its functionality. In some embodiments, the object recognition component 104 includes an Object Character Recognition (OCR) component that is configured to detect natural language characters and covert such characters into a machine-readable format (e.g., so that it can be processed via a machine learning model). In an illustrative example, the OCR component can perform image quality functionality to change the appearance of the document by converting a color document to greyscale, performing desaturation (removing color), changing brightness, and changing contrast for contrast correctness, and the like. Responsively, the OCR component can perform a computer process of rotating the document image to a uniform orientation, which is referred to as "deskewing" the image. From time to time, user-uploaded documents are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, when a document is uploaded, such as through scanning or taking a picture from a camera, it is common for resulting images to contain unnecessary dots or other marks due to the malfunction of printers. In order to be isolated from the distractions of this meaningless noise, some embodiments clean the images by removing these marks. In response to the removing the background noise, some embodiments extract the characters from the document image and place the extracted characters in another format, such as JSON. Formats, such as JSON, can be used as input for other machine learning models, such as Convolutional Neural Networks (CNN) for object detection and/or modified BERT models for language predictions, as described in more detail below.

In some embodiments, the object recognition component 104 additionally or alternatively includes an object detection module to detect objects in the document (e.g., via a machine learning model). For example, in some embodiments, in response to the OCR component performing its functionality, text and object detection can be performed to convert 2D grayscale images to structured text associated with their bounding boxes and coordinates. For example, some embodiments use computer vision, object detection, and/or image classification techniques (e.g., Convolutional Neural Networks). In an illustrative example of object detection functionality, particular embodiments use one or more machine learning models (e.g., a Convolutional Neural Network (CNN)) to generate a bounding box that defines the boundaries and encompasses a computer object representing a feature (e.g., a page number, block, a number, etc.) of a document. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents. In an illustrative example, on a first page, a first bounding box can be generated over a page number and labeled as "page 1", a second bounding box can be generated over a paragraph and labeled "third paragraph", and a third bounding box can be generated over an object (e.g., a mountain image) and labeled "mountain".

In some embodiments, one or more machine learning models can be used and trained to generate tighter bounding boxes for each object. In this way, bounding boxes can change in shape and confidence levels for classification/prediction and can be increased based on increased training sessions. For example, the output of a CNN or any other machine learning model described herein can be one or more bounding boxes over each feature of an image (corresponding to a feature in a document), where each bounding box includes the classification prediction (e.g., this object is a building) and the confidence level (e.g., 90% probability).

In various embodiments, the object recognition component 104 (or a machine learning model used by the document processing module) classifies or otherwise predicts whether various features included in one or more pages of each document belong to certain classes or categories (e.g., the object detected is a paragraph about cars). These predictions or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem. Moreover, any suitable model type can be used, such as a classifier model (e.g., a CNN classifier), a regression model (e.g., Random Forest Regression model), a clustering model (e.g., K-Means clustering), and the like.

The pre-processing module 106 is generally responsible for performing various cleaning or data preparation steps before documents are further processed (e.g., through one or more natural language processing machine learning models). In some embodiments, the pre-processing module 106 performs its functionality in response to the object recognition component 104 performing its functionality.

The block clustering module 106-1 is generally responsible for clustering different elements of a document together for natural language processing purposes. As described above, some highly unstructured documents are not neatly organized by paragraphs or sentences, such as invoices or other financial documents. As such, some embodiments tag or treat blocks of document elements as paragraphs, which is described in more detail below.

The coordinate module 106-2 is generally responsible for sorting each token in each block based on the coordinates of each token within a corresponding document. A "token" as described herein refers to an individual element of a document, such as a word, number, sign, symbol, and/or the like. For example, the coordinate module 106-2 can sort the tokens in each block based on the X (left/right) and Y (top/bottom) coordinates of each token (each token can be represented as ['word,' xmin, xmax, ymin, ymax]) to make sure the tokens in the same line in the block will appear together as the order in the document.

The filtering module 106-3 is generally responsible for filtering out or removing each token generated by the object recognition component 104 that has a confidence score or prediction lower than a particular threshold (e.g., 0.8). For example, if a character sequence in a document is predicted to be a particular word with only a 60% confidence score, then the corresponding character sequences can be removed from the document altogether.

The number-text tagger 106-4 is generally responsible for generating additional natural language word tags from numerical values in preparation for generating embeddings. As described above, existing natural language processing models are not configured to process numbers or otherwise embed words in feature vector space based on semantic similarity to numbers. Accordingly, some embodiments generate tags that indicate a type or category that a number belongs to, as well as a tag that indicates the actual number payload. For instance, data, currency, address, payment term numbers, and the like (e.g., "Next 07/10/14") can be tagged by placing keywords before each taggable candidate. In an illustrative example, the tokens "invoice date May 11 2018" would become "Invoice date date_str_after may 11 2018." This new tag indicates that 11 2018 corresponds to an invoice date. In another example, the tokens "total amount due $114.88" would change to "total amount due currency_str_after $114.88." This indicates that the numerical value of 114.88 corresponds to "currency" as opposed to a date, for example. Such keyword injection can provide more context for natural language processing models so that they more accurately embed words or numerical values in feature space.

In some embodiments, such tagging by the number-text tagger 106-4 is automated and occurs based on one or more rules and/or other language processing functionality. For example, a plurality of symbols (e.g., $, /, %) can be mapped (e.g., via a hash map or lookup table) to the corresponding tag (e.g., "date" or "currency") to be inserted. For example, a rule can be that if a token contains the symbol $, embodiments can tag the symbol with a "currency" keyword or tag (e.g., via mapping the $ symbol to the "currency" tag in a particular hash table record). Likewise, another rule can state that if there are one or more // symbols, embodiments can tag the symbol with a "date" keyword or tag. Additionally or alternatively, some embodiments use the context of nearby (e.g., within a threshold distance in k-means clustering) natural language words (e.g., via NLP). For example, the words "total amount due" is indicative of a "currency" tag to be placed next to numerical values, as opposed to an "invoice date" tag, for example. Such NLP processing can be performed using an encoder, transformer, or modified BERT model, as described in more detail herein.

The noise remover 106-5 is generally responsible for removing noise characters, symbols, or other tokens that are not important for downstream processing. In some instances, existing OCR technologies (e.g., GOOGLE OCR API) recognize characters that are fairly noisy for particular embodiments to process and are not important for making predictions. Accordingly, some embodiments remove, from documents, these tokens. For example, some embodiments can remove the following symbols—['!', '"', '&', '"', '(', ')', '*', '+', '-', '.', '/', ':', ';', '<', '=', '>', '?', '[', '\\', ']', '^', '_', '`', '{', '|', '}', '~'] and any non-ascii characters. Some embodiments additionally or alternatively replace consecutive spaces with a single space.

The pre-training component 108 is generally responsible for training one or more machine learning models to understand natural language words and the context (e.g., other words and numbers) typically associated with those words.

In some embodiments, the pre-training component 108 alternatively or additionally uses other NLP-based functionality to understand language and context. NLP determines semantic relationships among different words, which includes determining what words have a same or similar (e.g., within a threshold distance when the words represent vectors) meaning, even if they are syntactically different. This is to say, semantic similarity between words on a document page can be determined even if they are syntactically different. "Syntax" or syntactic properties refers to the structure of character sequences of the content (as opposed to the semantics or meaning), such as the structure of a sentence. For example, "car" and "far" are syntactically similar but have two different definitions so they are not semantically similar. Rather, "far" and "distant" are semantically similar because they mean the same thing, even though they are structurally or syntactically different.

In some embodiments, the pre-training component 108 uses NLP by tokenizing text (e.g., blocks) on pages into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a page is tagged with identifiers, such as POS identifiers.

In some embodiments, NLP derives semantic and syntactic content of semi-structured or unstructured data (e.g., data in image files). This is in contrast to analyzing "structured" data, such as data in a database. NLP can be configured to parse content to determine semantic context (e.g., the meaning of words by analyzing each word in a page against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, the pre-training component 108 additionally or alternatively uses other NLP-based functionality, such as Named Entity Recognition (NER). NER is an information extraction technique that identifies and classifies elements or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location, time, price (or other invoice data) and the like. In this context of the present disclosure, for example, these tags or labels can indicate whether certain extracted attributes correspond to a "price" of an item, the name of an entity (e.g., a particular corporation), line item information (e.g., description of service or item billed), address of an entity, the particular date listed on the page, or total amount due on an invoice.

In some embodiments, the pre-training component 108 additionally or alternatively uses word embeddings to tag or determine that a set of attributes of one or more pages of a document. In this way, different words or other characters in pages of documents can be converted into feature vectors of numerical values and embedded in feature space based on how semantically similar (e.g., via cosine or Euclidian distance) each word or other character sequence is to each other. In various embodiments, such word embeddings are produced by variations of BERT, WORD2VEC, GloVe, and/or any other suitable word embedding models.

A "word embedding" or "embedding" as described herein includes vectors in feature space (e.g., also known as vector space or linear space) based on a contextual (e.g., semantic) similarity, feature similarity, and/or other similarity. In some embodiments, two or more vectors that are semantically similar (e.g., have the same or similar meaning) may be mapped or embedded near each other in vector space regardless of the syntactic similarity (e.g., similarity between word structure or appearance). Through this semantic relationship functionality, computers can understand how similar words (or extracted attributes of words) are to each other and/or how similar they are to other words (e.g., via cosine distance).

A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. In some embodiments, the pre-training component 108 processes or embeds feature vectors in feature space based on training one or more machine learning models, which is described in more detail below.

The knowledge distillation component 108-1 is generally responsible for using compression techniques to compress a first version of a machine learning model into a smaller second version of the machine learning model. In this way, pre-training component 108 can learn natural language and context based on a smaller dataset and thus a lighter model, relative to full models. For example, knowledge distillation can be performed during pre-training in order to reduce the size of an existing BERT model by 40%, while retaining 97% of its language understanding capabilities and being 60% faster than BERT. In other words, it is possible to reach similar performances on particular downstream tasks using much smaller language models pre-trained with knowledge distillation, resulting in models that are lighter and faster at inference or prediction time, while also requiring a smaller computational training budget. Such compression techniques can be, for example, knowledge distillation. Knowledge distillation is a compression technique in which a compact model—the student—is trained to reproduce the behavior of a larger model—the teacher—or an ensemble of models. In supervised learning, a classification model is generally trained to predict an instance class by maximizing the estimated probability of gold labels. A standard training objective thus involves minimizing the cross-entropy between the model's predicted distribution and the one-hot empirical distribution of training labels. A model performing well on the training set will predict an output distribution with high probability on the correct class and with near-zero probabilities on other classes. But some of these "near-zero" probabilities are larger than others and reflect, in part, the generalization capabilities of the model and how well it will perform on the test set.

Training loss, the student is trained with a distillation loss over the soft target probabilities of the teacher:

$$L_{ce} = \Sigma_i t_i * \log(s_i) \qquad \#1$$

where $t_i$ (resp. $s_i$) is a probability estimated by the teacher (resp. the student). This objective results in a rich training signal by leveraging the full teacher distribution. In some embodiments, a softmax-temperature is used:

$$p_i = \frac{\exp(z_i/T)}{\sum_j \exp(z_j/T)} \qquad (\#2)$$

where T controls the smoothness of the output distribution and $z_i$ is the model score for the class i. The same temperature T is applied to the student and the teacher at training time, while at inference, T is set to 1 to recover a standard softmax. The final training objective is a linear combination of the distillation loss $L_{ce}$ with the supervised training loss, which can be the masked language modeling loss $L_{mlm}$. Some embodiments add a cosine embedding loss ($L_{cos}$), which will tend to align the directions of the student and teacher hidden states vectors.

The context, question, and/or answer pair generator 112 is generally responsible for building context, question (context-question), and/or answer pairs in preparation for fine-tuning and/or making inferences using one or more machine learning models. For example, regarding fine-tuning, the context, question, and/or answer pair generator 112 is responsible for building context, question, and answer pairs to train on. For example, the context, question, and/or answer pair generator 112 can build a hash map, where the key is context and the values are all the natural language characters and numerical values in a document (e.g., via google FullTextAnnotation returned by Google Vision API or results generated by pdfminer from digital documents), and no other information, such as tables, charts, or formatting data.

The context, question, and/or answer pair generator 112 can additionally consolidate all date/phone number/address/url/email strings (or any suitable representations) in context to uniform format, and truncate the whole context where length>512 words to 512, for example. The context, question, and/or answer pair generator 112 can also map or select one or more of the candidate answers from the context to each particular question. For example, some embodiments can populate a data structure with a particular question and then list each candidate answer value for the particular question underneath the question. Each candidate answer value can be populated in any suitable manner. For example, each numerical value indicated in the document (e.g., and their nearest N neighbors) may be selected, such as "Jun. 24 2021"). In some embodiments, the data structure includes the starting character position and end character position for each answer. For example, if a question is, "what is the payment date for this invoice?" the answer "Jan. 4, 2022" may have a starting character position of "J" (for January) and an ending character position of "2" (for 2022). In some embodiments the char index must be untouched in later process unless stated otherwise. In some embodiments, in training, there may be 1 or 0 answers for a question, for predicting. That is, 1 question may have 0-N answers. For training, if the ground truth is not in the context, then some embodiments mark the question as unanswerable later training would skip this context.

Regarding inference time, the context, question, and/or answer pair generator 112 builds context question pairs (without answers at this point). For example, the generator 112 can map the context to one or more questions that are to be answered. For example, the generator 112 can map, via a data structure, each block determined by the block clustering module 106-1 to one or more questions that are used to predict the answers for the corresponding block. For example, for a first block that contains "bill to" information, one of the questions selected can be, "what entity is responsible for paying this bill?" Although the generator 112 and the answer generator 114-1 are described in the context of Question Answering systems, it is understood that this is representative only. As such, other prediction mechanisms can alternatively (or additionally) be used, such as neural machine translation, sentiment analysis, and/or text summarization.

The fine-tuning component 113 is generally responsible for taking, as input, the context, question, and answer pairs generated by the context, question, and/or answer pair generator 112 in order to fine-tune one or more machine learning models that have already been trained via the pre-training component. Fine-tuning takes a model that has already been trained (e.g., via the pre-training component 108) for a particular task and then fine-tunes or tweaks it to make it perform a second similar task. For example, a deep learning network that has been trained to understand natural language and context can be fine-tuned by training using a Question Answer system on invoice documents, which is described in more detail below. Specifically, fine-tuning means taking weights of a trained neural network and use it as initialization for a new model being trained on data from the same domain (e.g., documents). Fine-tuning can thus be used to improve accuracy, overcome a small dataset size, and/or speed up training.

The inference component 114 is generally responsible for making inferences or predictions at runtime after the one or more machine learning models have been pre-trained and fin-tuned via the components 108 and 112. For example, the inference component 114 can take, as input, the context-question pairs generated by the context, question and then predict answers to the particular questions via the answer generator 114-1. For instance, now that a model understands and can process natural language, such as English (e.g., via the pre-training component 108) and learns particular answers to particular questions (e.g., via the fine-tuning component 113), the inference component 114 predicts the answers to the particular question based on the pre-training and fine-tuning, as described in more detail below.

The answer location generator 114-2 is generally responsible for determining a location of the predicted answer(s) within the input document that was originally processed by the document conversion module 102. For example, the answer location generator 114 can call or communicate the answer value to an object detection module located in the object recognition component 104 in order to place a bounding box and/or other indicia (e.g., arrows, colored highlights, etc.) over the answer. For example, the object recognition document 104 can match the received answer (e.g., "Mar. 7, 2022") to the same value located in the document and then responsively formulate a bounding box over this value, as well as a green color (e.g., indicating a high confidence that this is the correct answer).

The presentation component 116 is generally responsible for causing presentation of content and related information to user devices, such as an indicator or bounding box indicating one or more answers or predictions made by the inference component 114. The presentation component 116 may comprise one or more applications or services on a user device, across multiple user devices, or in the cloud. For example, in one embodiment, presentation component 116 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation component 116 generates (or causes generation of) user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

The storage 125 (e.g., a database, RAM, cache, persistent storage, etc.) can include documents, different training data (e.g., labeled documents) that have been used to train deep neural networks or other machine learning models, as described in more detail below. Additionally or alternatively, storage 125 can include the maps, data structures, or routines needed by the components of the system 100.

Figure 2:
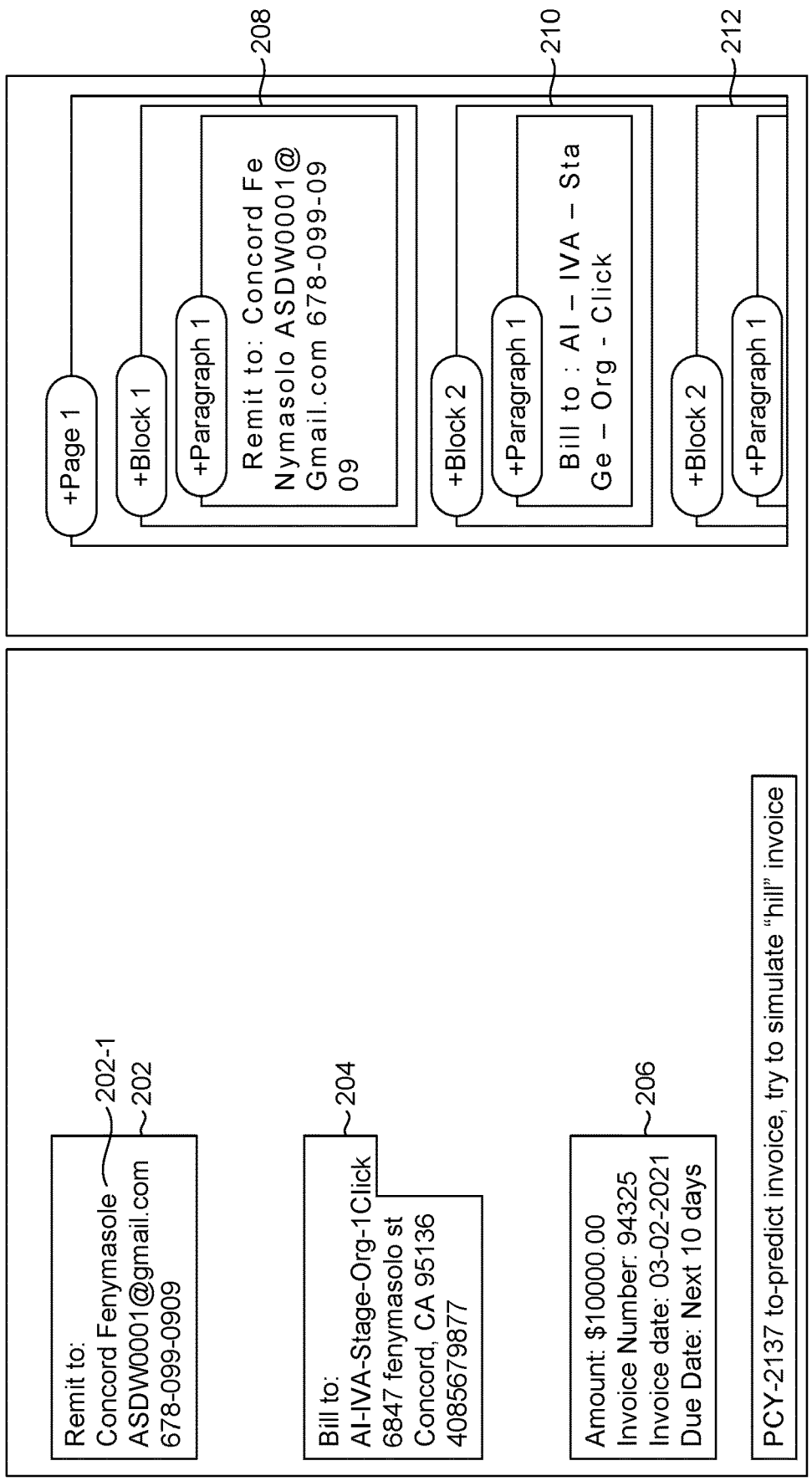
FIG. 2 is a schematic diagram of a document, indicating how a document can be pre-processed, according to some embodiments.

FIG. 2 is a schematic diagram of a document 200, indicating how a document can be pre-processed, according to some embodiments. In some embodiments, the functionality described with respect to FIG. 2 includes identical or similar functionality as described with respect to the pre-processing module 106 of FIG. 1.

The document 200 (e.g., an invoice) includes various blocks 202, 204, and 206, and each bock includes various lines (e.g., line 202-1 "Concord Fenymasole"). In some embodiments, the first step is to automatically cluster (e.g., via the block clustering module 106-1) text within the document 200 into different blocks using K-means, where K is selected based on silhouette scores. A silhouette value is a measure of how similar an object is to its own cluster (cohesion) compared to other clusters (separation). As described herein, certain documents, such as financial documents, are highly unstructured so they do not include neatly formed paragraphs or sentences so normal natural language processing or object recognition components may have trouble detecting particular elements. As such, certain embodiments treat blocks as paragraphs in natural language. Unlike natural language that has several ordered paragraphs, an invoice text block, for example, can have blocks ordered from top to bottom and left to right-above/below/left/right. Accordingly, for example OCR functionality can read elements in the following order-pages, blocks (acting as paragraphs), lines, words (e.g., "Concord"), and then individual characters (e.g., "C"). Such functionality is indicated in the elements 208, 210, and 212, which indicate that for page 1 (i.e., the document 200), there are 3 respective blocks and paragraphs (i.e., blocks 1, 2, and 3) corresponding to blocks 202, 204, and 206.

Regarding K-means clustering, in some embodiments, a user can select the quantity of clusters he or she wants to identify in the data. This is the "k," value for example in k-means clustering. For example, the user can group a first instance (describing who an invoice is from) into a first block and a second instance (describing the billing amount data) into a second block, where each cluster and data point is indicative of whether the corresponding characters belong to the first block or second block (k=2). In some embodiments, the k-value that is selected is determined by calculating the silhouette value that measures how similar a point is to its own cluster (cohesion) compared to other clusters (separation), which is a point at which variation between data points goes from a relatively large reduction in variation to minimal reduction in variation.

Next, in various embodiments, the k value of distinct data points are randomly selected as the initial clusters. For example, where k=3, three blocks can be selected as the initial clusters. Next, a distance can be measured (e.g., by one or more machine learning models) between a first point (e.g., a word or numerical value in a block) of a plurality of data points and each point of the initially selected clusters. For example, after a data point is selected, the distance (e.g., Euclidian distance) between the data point and each of the initially selected clusters (or centeroid point) is measured. Next, the first is assigned (e.g., by the one or more machine learning models) to the nearest of the initially selected clusters, such that two points are now within the same cluster. For example, a first data point is assigned to a cluster or a second data point, since the distance between the first data point and the second data point is closer than the distance between first data point and other data points. Next, this process is repeated for each data point or word/numerical value in each cluster.

In some embodiments, after each point (e.g., a word) of the plurality of points has been assigned to a cluster, the mean or center data point of each cluster is then calculated (e.g., by the one or more machine learning models), which concludes a first round of clustering. Responsively, each center data point or mean is then used as initial data point clusters and the process described above is repeated for a second round of clustering.

In some embodiments, in response to the clustering, various embodiments sort the tokens in each bock based on the corresponding coordinates as indicated in the document 200. This functionality is described with respect to the coordinate module 106-2 of FIG. 2. For example, embodiments can sort the text "Remit to: Concord Fe . . . " under the block and paragraph indicia, as indicated in the element 208.

In some embodiments, in response to the sorting of tokens, various embodiments filter out the tokens with confidence scores that are lower than a particular threshold. Examples of this are described with respect to the filtering module 106-3 of FIG. 1. In some embodiments, in response to the filtering, some embodiments generate keyword tags for numerical values, as described, for example, with respect to the number-text tagger 106-4 of FIG. 1. For example, for the numbers "95136 4085679877" embodiments can tag this as an "address." In response to this tagging, some embodiments remove extra noise, as described, for example, with respect to the noise remover 106-5.

Figure 3:
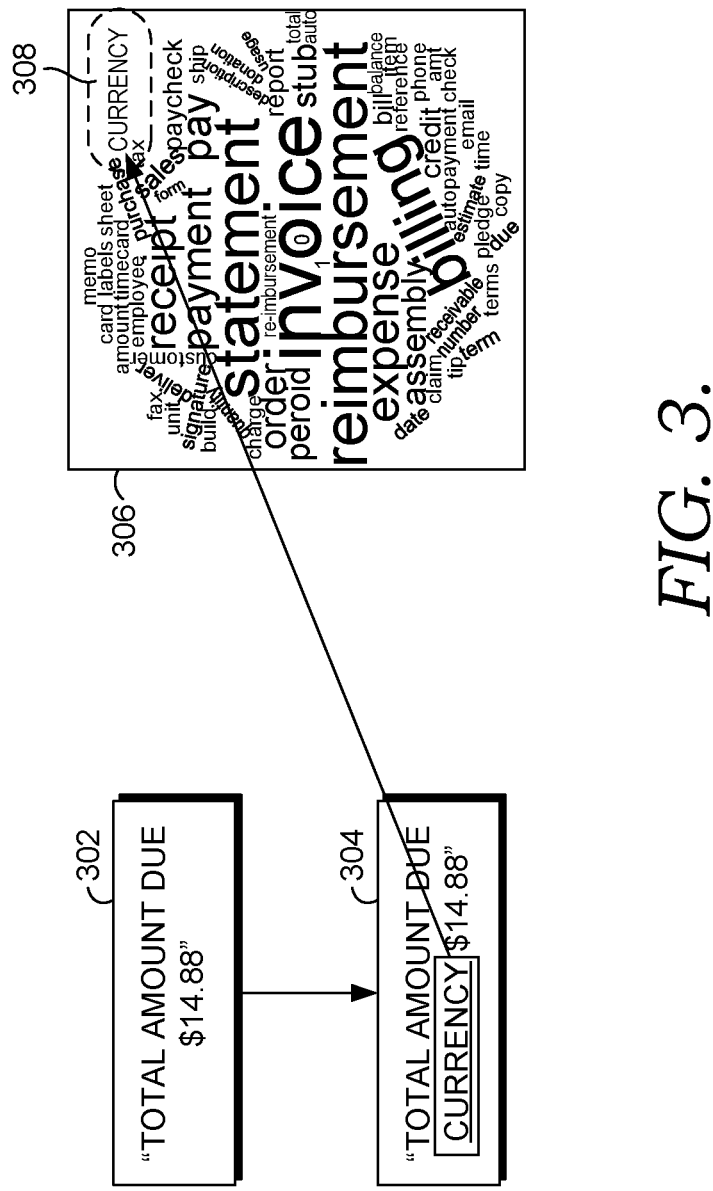
FIG. 3 is a schematic diagram illustrating how vectors associated with numbers are run through an NLP-based model that outputs a word embedding, according to some embodiments.

FIG. 3 is a schematic diagram illustrating how vectors associated with numbers are run through an NLP-based model that outputs a word embedding, according to some embodiments. In some embodiments, functionality described with respect to FIG. 3 is performed or used by the pre-training component 108 in order to understand language. Alternatively or additionally, such functionality is performed or used by the fine-tuning component 113.

In some embodiments, the NLP-based model of FIG. 3 represents a modified BERT model, as described herein. In some embodiments, these models run one or more input vectors (e.g., characters within the context 304) through a hidden layer (i.e., a column-row matrix) and a projection layer (e.g., a softmax classifier). In embodiments, when words are processed through a corresponding word embedding model, the words are numerically represented in a word embedding that shows associated vectors and the distances from the string representations to each of those vectors, which is described in more detail below.

In order to embed or place points or vectors within the feature space 306, the model is trained using training data (e.g., numerical representations of all of the words in the feature space 306). In various embodiments, the training data includes a large corpus of unstructured data semi-structured, and/or structured data. The training data is also an input of the NLP-based model. The training data includes some or each of the words as found within the feature space 306.

In some embodiments, the feature space 306 represents a "pre-trained" embedding. A pre-trained embedding is a static model that is generated without feedback, retraining, or reference to the data sets being fed through it. For example, a user may download a static word embedding from an online source, which is already trained and includes the vectors or data points already mapped in vector space according to semantic similarity between words. In other embodiments, the feature space 306 represents a "retrained" or trained embedding. A retrained or trained word embedding receives training feedback after it has received initial training session(s) and is optimized or generated for a specific data set (e.g., trained invoices).

In order to map each of the word of the trained data (or the words 304) to its contextually appropriate point in the vector space 306, training algorithms are utilized. For example, in some embodiments, the NLP-based model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h)) = \frac{\exp\{\text{score}(w_t, h)\}}{\sum \text{word } w' \text{ in } Vocab^{\exp\{\text{score}(w', h)\}}} \quad (\#3)$$

Where score ($w_t$, h) computes the compatibility of word $w_t$ with the context h. The model is trained by maximizing its log-likelihood on the training set that is maximizing $$J_{ML} = \log P(w_t \mid h) = \text{score}(w_t, h) - \log$$

This yields a properly normalized probabilistic model for language modeling. Each probability is computed and normalized using the score for all other words w' in the current context h at every training step. In some embodiments, some models are trained using a binary classification objective, such as logistic regression, to discriminate the real target words $w_t$ from K noise words w', in the same context. Accordingly, instead of a softmax classifier, a noise classifier is used.

The output of the training algorithms and/or actual data input is each of the positional words in the feature space 306, which shows groupings of words that are similar (e.g., semantically similar). "Semantic similarity" is the semantic distance between two or more concepts or words. The "distance" between any two or more words in some embodiments is based on the similarity of their meaning and/or semantic content, as opposed to any syntax similarity.

In some embodiments, the output as represented in the feature space 306 is computed based on a NLP-based model computing semantic similarity between words. For example, a vocabulary set (e.g., all the words in the feature space 306) may first be converted into input vectors via an input vector encoding (e.g., one hot encoding). For example, the word "Total" may be converted into the vector [1,0,0,0,0]. This vector representation shows various dimensions, where each value corresponds to ordered words (e.g., each word in a set of trained test data candidates) and whether the word is TRUE or present. Because "Total" is the only word being run through the NLP-based model in this example, the integer 1 is used to indicate its representation. "Total" does not contain any of the other words within it (e.g., "amount" or "due") so the other values are represented as 0. In some embodiments, based on generating the softmax function above or the output layer of the neural network, an output embedding vector representation can be generated, which is indicative of the actual coordinates that a vector will be embedded or placed in feature space 306 based on semantic similarity to other words and/or averaging or otherwise combining the output embedding vectors for all of the words within a particular search result candidate or test case identifier. For example, using the illustration above, the "Total" vector [1,0,0,0,0] can be converted to an output layer vector [1,2], which is the 2-dimensional plotting coordinates in feature space 306.

The distance between any two vectors or words is measured according to any suitable method, such as Euclidian or Cosine similarity. For example, in some embodiments, automated cosine similarity is used to compute distance. Cosine similarity is a measure of similarity between two non-zero vectors of an inner product space that measures the cosine of the angle between the two non-zero vectors. In these embodiments, no similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity.

In some embodiments, FIG. 3 represents or includes a word-category co-occurrence matrix (e.g., a compilation of vector spaces). A matrix includes one or more vectors of a first vector space multiplied by one or more vectors of a second vector space (e.g., multiplying each word in a test case identifier and/or test data candidate to get a final distance). This allows rows within the vector space to be normalized for summing to 1 to become a probability distribution. Words or vectors can be compared using their category distribution. In some embodiments, each vector representing a word in a dataset (e.g., within the context 303) is combined or aggregated (e.g., via a dot product operation) with another word in the dataset in order to get an aggregated score or distance any context set (e.g., a block) is to another context set.

After the training data is run through the training algorithm, the output is represented in the feature space 306. In some embodiments, subsequent to generating the training data 306 in the feature space 306, the context 304 is received and embedded in the feature space 306. As described herein, NLP-based models are not configured to understand context with explicit numbers, such as found within the context 302. The words "total" and "amount" and "due," for example, are not necessarily associated with currency. Accordingly, various embodiments generate additional tags or words from the context 302, such as the "currency" tag as indicated in the context 304 (e.g., as described with respect to the number-text tagger 106-4) so that the NLP-based model can use more context for placing vectors in embeddings. Each token or word within the context 304 is then converted to a vector and mapped in the vector space 306. For example, as illustrated in FIG. 3, the word "currency" 308 is mapped or embedded to its place next to "paycheck" "sales" and "pay" in the feature space 306 based on its semantic similarity to these other words. As described herein, some embodiments aggregate or combine such mapping (e.g., via a dot product function) with other mappings of words (e.g., "total") in the same context 304 in order to determine the overall or aggregated distance between the context 304 and other contexts or blocks, which are used to generate predictions (e.g., answers) or inferences. For example, each word in the question "how much do I owe the supplier?" may be aggregated and then embedded (e.g., via a dot product function) and be within a threshold distance to the context 304, largely in part because of the added tag of "currency." In other words, for example, the word "currency" 308 may be close in distance to the words "owe" in the question. Accordingly, because the distance of the context 304 is closer to the aggregated vector representing this question relative to other vectors representing other questions, then the answer of "$14.88" may be selected to answer the question.

Figure 4:
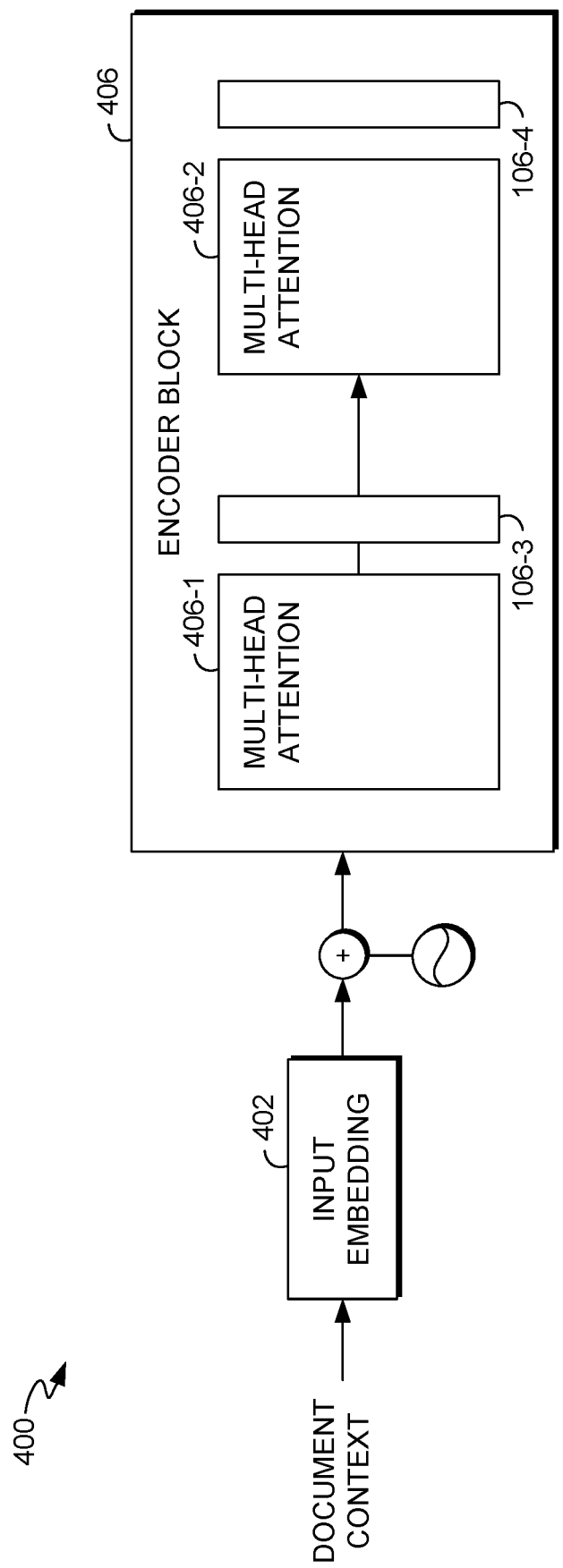
FIG. 4 is a block diagram of a modified BERT model or encoder, according to some embodiments.

FIG. 4 is a block diagram of a modified BERT model or encoder 400, according to some embodiments. In some embodiments, this model is used by the pre-training component 108, the fine-tuning component 113, and/or the inference component 114 of FIG. 1. First, the document context (e.g., all of the natural language text in the document) is converted into vectors and embedded into input embedding 402 to derive meaning of the individual word. In some embodiments, each word in the document context is mapped into the word embedding 402 in parallel or at the same time, unlike existing LSTM models, for example.

The input embedding 402 maps a word in the document contents to a feature vector representing the word. But the same word (e.g., "apple") in different sentences may have different meanings (e.g., phone v. fruit). This is why a positional encoder 404 can be implemented. A positional encoder is a vector that gives context to words (e.g., "apple") based on a position of a word in a block or sentence. For example, referring back to FIG. 2, because "Bill to" in the block 204 is at the beginning of a block and next the entity name (i.e., "AI-IVA Stage-Org-1click") and the address, embodiments can indicate a position in an embedding closer to an entity responsible for paying a bill, as opposed to "Bill" referring to a name. Some embodiments use a sign/cosine function to generate the positional encoder vector as follows:

$$PE_{(pos,2i)}=\sin(pos/10000^{2i/d_{model}})$$

$$PE_{(pos,2i+1)}=\cos(pos/10000^{2i/d_{model}}) \quad (\#4)$$

After passing the document context through the input embedding 402 and applying the positional encoder 404, the output is a word embedding feature vector, which encodes positional information or context (e.g., as indicated in the feature space 306 of FIG. 3) based on the positional encoder 404. These word embedding feature vectors are then passed to the encoder block 406, where it goes through a multi-head attention layer 406-1 and a feedforward layer 406-2. The multi-head attention layer 406-1 is generally responsible for focusing or processing certain parts of the feature vectors representing specific portions of the document context by generating attention vectors. For example, in Question Answering systems, the multi-head attention layer 406-1 determines how relevant the ith word (or particular word in a block) is for answering the question or relevant to other words in the same or other blocks, the output of which is an attention vector. For every word, some embodiments generate an attention vector, which captures contextual relationships between other words in the same sentence, block, and or line. For a given word, some embodiments compute a weighted average or otherwise aggregate attention vectors of other words that contain the given word (e.g., other words in the same line or block) to compute a final attention vector.

In some embodiments, a single headed attention has abstract vectors Q, K, and V that extract different components of a particular word. These are used to compute the attention vectors for every word, using the following formula:

$$Z = softmax\left(\frac{Q.K^T}{\sqrt{\text{Dimension of vector } Q, K, \text{or } V}}\right).V \quad (\#5)$$

For multi-headed attention, there a multiple weight matrices $W^q$, $W^k$ and $W^v$ so there are multiple attention vectors Z for every word. However, a neural network may only expect one attention vector per word. Accordingly, another weighted matrix, $W^z$, is used to make sure the output is still an attention vector per word. In some embodiments, after the layers 406-1 and 406-2, there is some form of normalization (e.g., batch normalization and/or layer normalization) performed to smoothen out the loss surface making it easier to optimize while using larger learning rates.

The feed forward layer 406-2 is a feed forward neural network that is applied to every one of the attention vectors outputted by the multi-head attention layer 406-1. The feed forward layer 406-2 transforms the attention vectors into a form that can be processed by the next encoder block or making a prediction. As described in more detail herein, in some embodiments, the encoder block 406 is used to train a machine learning model and make inferences.

Figure 5:
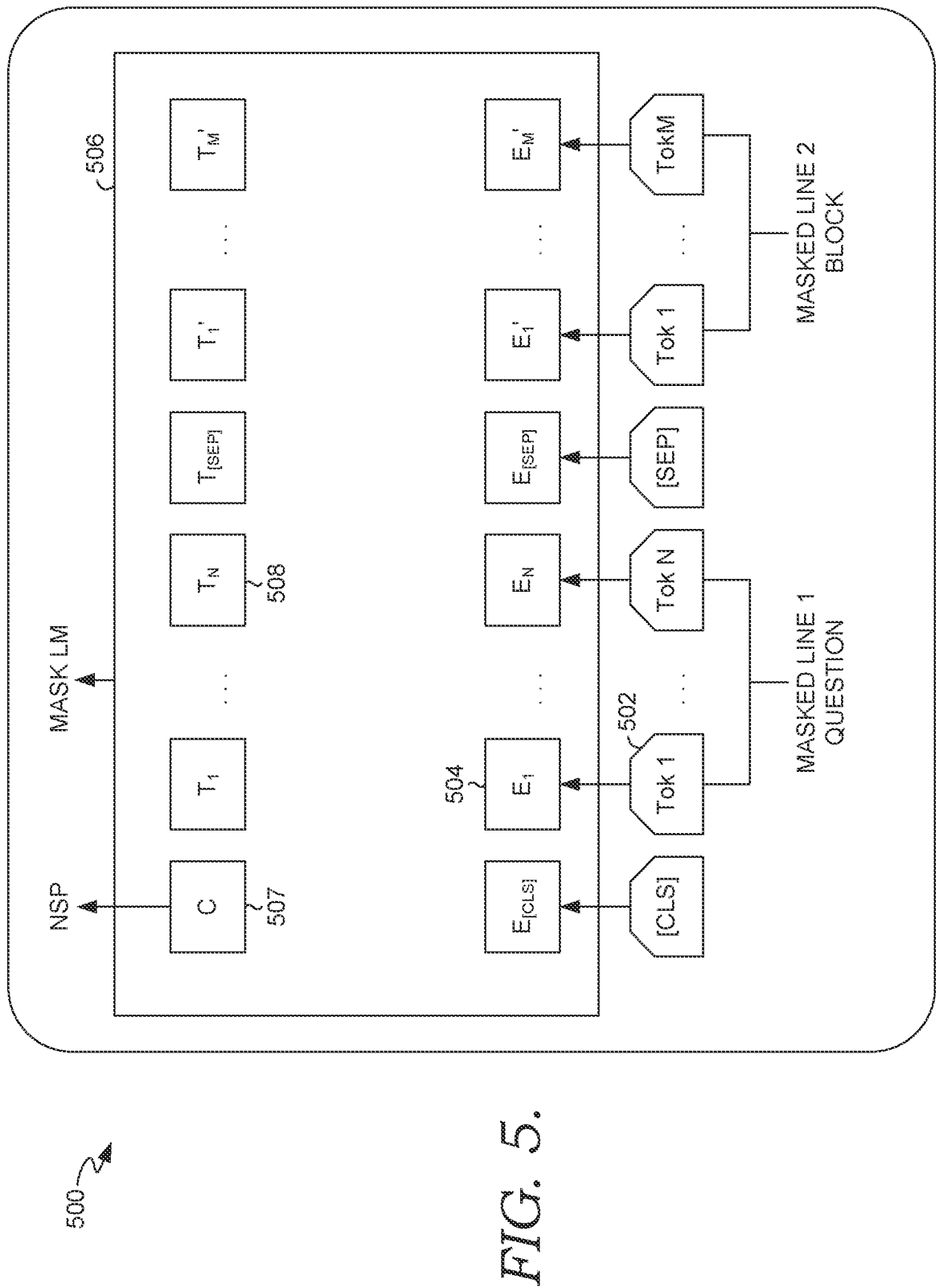
FIG. 5 is a schematic diagram illustrating how pre-training and fine-tuning can be performed via an encoder (or set of encoders), according to some embodiments.

FIG. 5 is a schematic diagram 500 illustrating how pre-training and fine-tuning can be performed via an encoder (or set of encoders), according to some embodiments. In some embodiments, the encoder 506 represents the encoder 406 of FIG. 4. As described herein, pre-training is performed to understand language (e.g., as described with respect to the pre-training component 108) and fine-tuning is performed to learn a specific task, such as learning an answer to a set of questions (e.g., as described with respect to the fine-tuning component 113).

As described above, in some embodiments, the encoder 506 learns what language and context for a word is in pre-training by training on two unsupervised tasks—MLM and NSP—simultaneously or at the same time. For MLM, the encoder 506 takes in a sentence, block, or line, with random words being replaced with masks. The goal is to output the value or meaning of the masked tokens. For example, if a line reads, "please [MASK] this document promptly," the prediction for the "mask" vale is "send." This helps the encoder 506 understand the bidirectional context in a sentence, line, or block. In the case of NSP, the encoder 505 takes, as input, two or more elements, such as blocks, lines, or paragraphs and determines, for example, if the second block actually follows the first block in an input document. This helps the encoder 506 understand the context across all the elements of a document, not just within a single element. Using both of these together, the encoder 505 derives a good understanding of language.

MLM and NSP are represented in FIG. 5. During pre-training, the input to the encoder 505 is a set of two masked lines (lines for which there are one or more masks), which could alternatively be blocks or sentences. Each word is represented as a token, and some of the tokens, are masked, such as the token 502. Each token is then converted into a word embedding (e.g., the output of 404 of FIG. 4). At the output side, C (element 507) is the binary output for the next sentence prediction. For example, this component may output 1, for example, if masked line 2 followed (e.g., was directly beneath) masked block 1. The "T" values (e.g., 508) are word feature vectors that correspond to the outputs for the MLM functionality. Thus, the number of word feature vectors that are input is the same number of word feature vectors that are output.

Once pre-training is performed, the encoder 506 can be trained on very specific tasks, such as Question Answering, on specific financial documents, such as invoices. For example, in Question Answering, some embodiments replace the fully connected output layers of the encoder 506 used in pre-training, with a fresh set of output layers that can output the answer to a given question. Subsequently, supervised training can be performed using a Question Answering dataset. As illustrated in FIG. 5, we can change the model for fine-tuning by changing the input layer and the output layer. That is, for example, the inputs are changed from the masked line 1 and 2 tokens to a "question" and "block" that contains an answer (or candidate answer) as the tokens. In the output layer, certain embodiments output the start and end words (or characters) that encapsulates the answer.

FIG. 6 is a schematic diagram illustrating in more detail how the inputs of FIG. 5 are processed in pre-training and fine-tuning, according to some embodiments. For example, FIG. 6 describes how the word embedding 504 is generated from the token input 502 (e.g., the masked line 1 word or question word) in some instances. The initial embedding is constructed from three vectors—the token embeddings, the context-question embeddings, and the position embeddings. In some embodiments, the following functionality occurs in the pre-training phase. The token embeddings are the pre-trained embeddings. In some embodiments, the context-question embeddings include the block or line number that is encoded into a vector. Additionally or alternatively, in some embodiments, the context-question embeddings include the context-question pairs (e.g., as described by the generator 112 of FIG. 1) that are encoded into a vector This is different than regular BERT models, which encode a sentence number in segment embeddings, for example. The position embeddings are vectors that represent the position of a particular word in such block or line (e.g., as described with respect to the component 404 of FIG. 4). When these three embeddings are added or concatenated together, an embedding vector is generated (e.g., the feature space 306 of FIG. 3) that is used as input into the encoder 506. The context-question and position embeddings are used for temporal ordering since all of the vectors are fed into the encoder 506 simultaneously and language models need some sort of order preserved. In the tuning phase, and at inference time, the segment vectors become context-question embeddings (e.g., as formulated by the context, question, and/or answer pair generator 112).

In pre-training, the output is typically a binary value C (for NSP) and various word vectors (for MLM). With training, a loss (e.g., cross entropy loss) is minimized. In some embodiments, all the feature vectors are of the same size and are generated simultaneously. As such, each word vector can be passed to a fully connected layered output with the same number of neurons equal to the same number of tokens in the vocabulary. In some embodiments, a weight activation for each class and loss values are manually reset, as described in more detail below. None of the existing BERT or encoder models perform these activation and loss steps.

Figure 7:
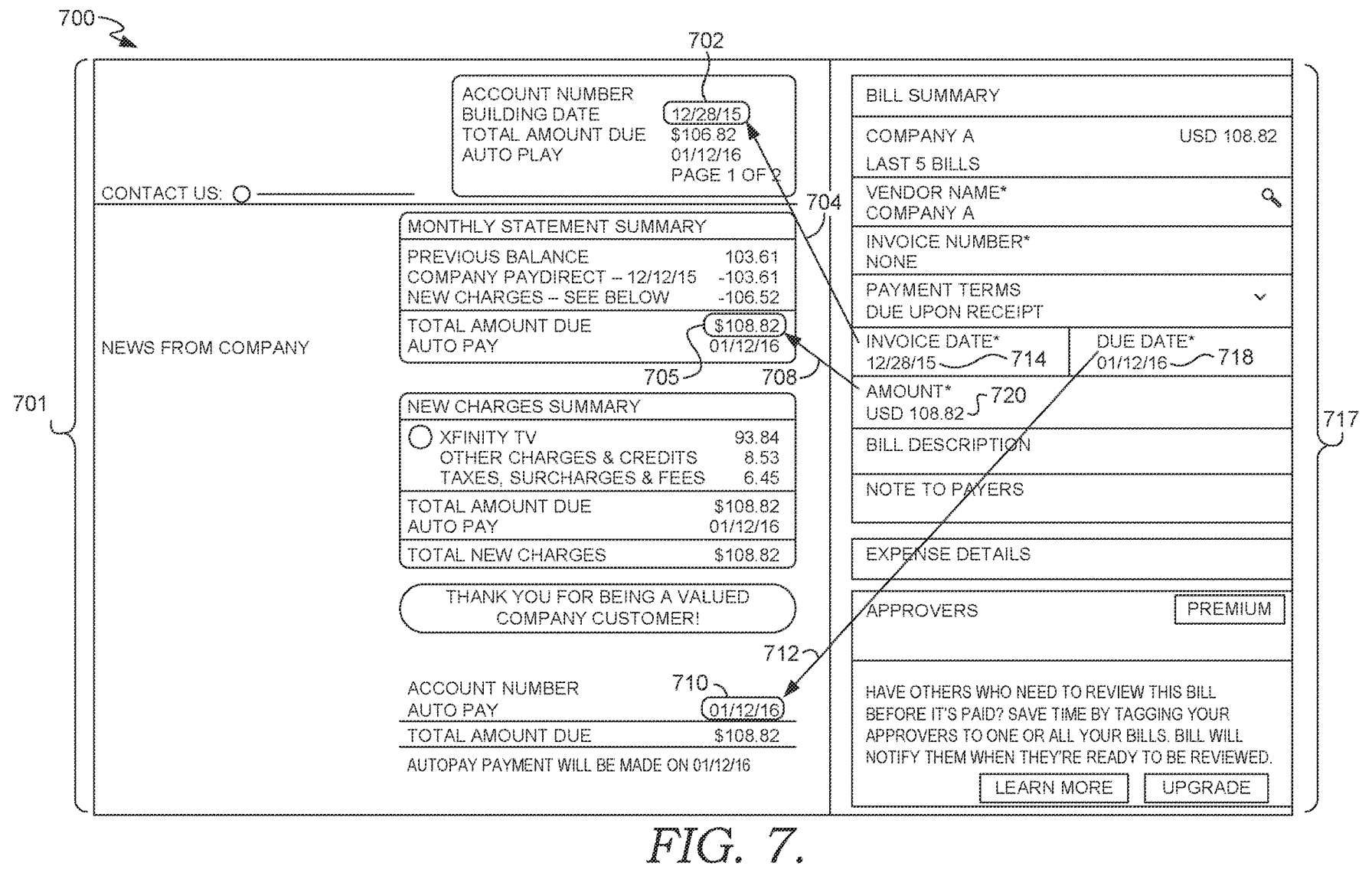

FIG. 7 is a screenshot 700 of an example user interface, according to some embodiments. In some embodiments, the screenshot 700 represents the output of the inference component 114 or what is produced by the presentation component 116 of FIG. 1.

The screenshot 700 includes the invoice 701, which may include the original invoice (e.g., the document converted by the document conversion module 102), except with additional indicia superimposed over the invoice 701, such as the bounding boxes 702, 706, and 710 and the arrows 704, 708, and 712. The screenshot 700 additionally includes the window pane 717, which corresponds to a bill summary that indicates (e.g., in different natural language relative to the invoice 701) the answers or other predictions (e.g., as determined by the inference component 114).

Specifically, the screenshot 700 indicates the prediction 718—"01/12/16" (e.g., as determined by the answer generator 114-1), and where the prediction is located within the document 701—i.e., "01/12/16" (e.g., as determined by the answer location generator 114-2)—as indicated within the bounding box 710, where an arrow 712 points from the prediction 718 within the window pane 717 to the prediction encompassed by the bounding box 710. Identical functionality occurs for the predictions 714 and 720, which likewise have respective arrows 704 and 708 pointing to the corresponding locations of where the answers were derived from within the invoice 701, as indicated by the bounding boxes 702 and 705 respectively.

In some embodiments, the question presented to the model to answer the question 718 is "what is the payment due date for this invoice?" Likewise, in some embodiments, the question presented to the model to answer the question 720 is "what is the total amount of the invoice?" Likewise, the question presented to the model to answer the question 714 may be "What is the invoice date for this invoice?" In some embodiments, particular questions are mapped (e.g., via a hash map) to particular fields within the window pane 717 before runtime or inference time (e.g., before the inference component 114 makes a prediction) so that particular embodiments know where to place the corresponding answers for a given question. For example, the question "what is the payment due date for this invoice" can be mapped to the "due date" field in the window pane 717 so that embodiments know where to populate the answer. In some embodiments, each prediction or answer is automatically populated (e.g., by the presentation component 116) in the corresponding fields within the window pane 717 in response to the document conversion module 102, the object recognition component 104, the pre-processing component 106, and the inference component 114 processing the invoice 701, as described with respect to FIG. 1.

FIG. 7 illustrates that oftentimes documents, such as invoices, do not inherently and clearly identify information, such as the "due date." Accordingly, placing the prediction or answer in the "due date" field in the window pane 717, for example, assists the user experience so that the user can better analyze an invoice. FIG. 7 also illustrates that sometimes documents are mere static images and can therefore not be used to perform dynamic functionality. However, certain embodiments can perform more dynamic functionality by importing or extracting specific words and the like from the invoice 710 for further analysis. For example, all of the information or predictions within the window pane 717 can be imported or copied to another application page or instance in order to, for example, keep a history of all invoice total amounts (and dynamically add all the total amounts) in a single document.

Figure 8:
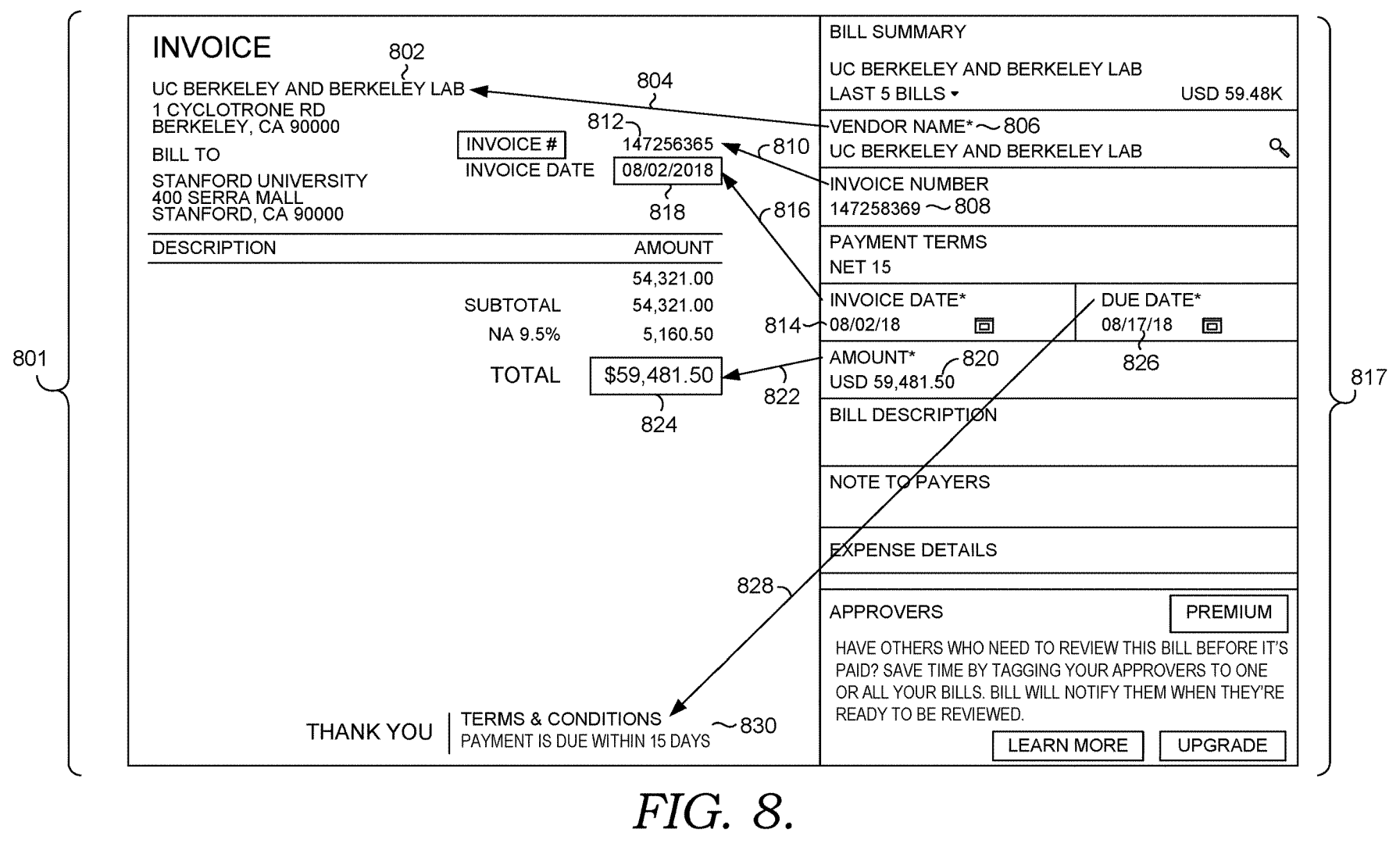

FIG. 8 is a screenshot 800 of an example user interface, according to some embodiments. In some embodiments, the screenshot 800 represents the output of the inference component 114 or what is produced by the presentation component 116 of FIG. 1. In some embodiments, the functionality indicated in the screenshot 800 includes identical or similar functionality as that described with respect to FIG. 7.

The screenshot includes the invoice 801, which may include the original invoice (e.g., the document converted by the document conversion module 102), except with additional indicia superimposed over the invoice 801, such as the arrows 810, 816, 822, and 828. The screenshot additionally includes the window pane 817, which corresponds to a bill summary that indicates (e.g., in different natural language relative to the invoice 801) the answers or other predictions (e.g., as determined by the inference component 114).

FIG. 8 illustrates the prediction 826 under the "due date" field and an arrow 828 pointing to the location 830 of the prediction within the invoice 801. Similar functionality is performed for the predictions 820, 814, 808, and 806, via the arrows 822, 816, 810, and 804 respectively, which point to the answers 824, 818, 812, and 802 respectively.

Figure 9:
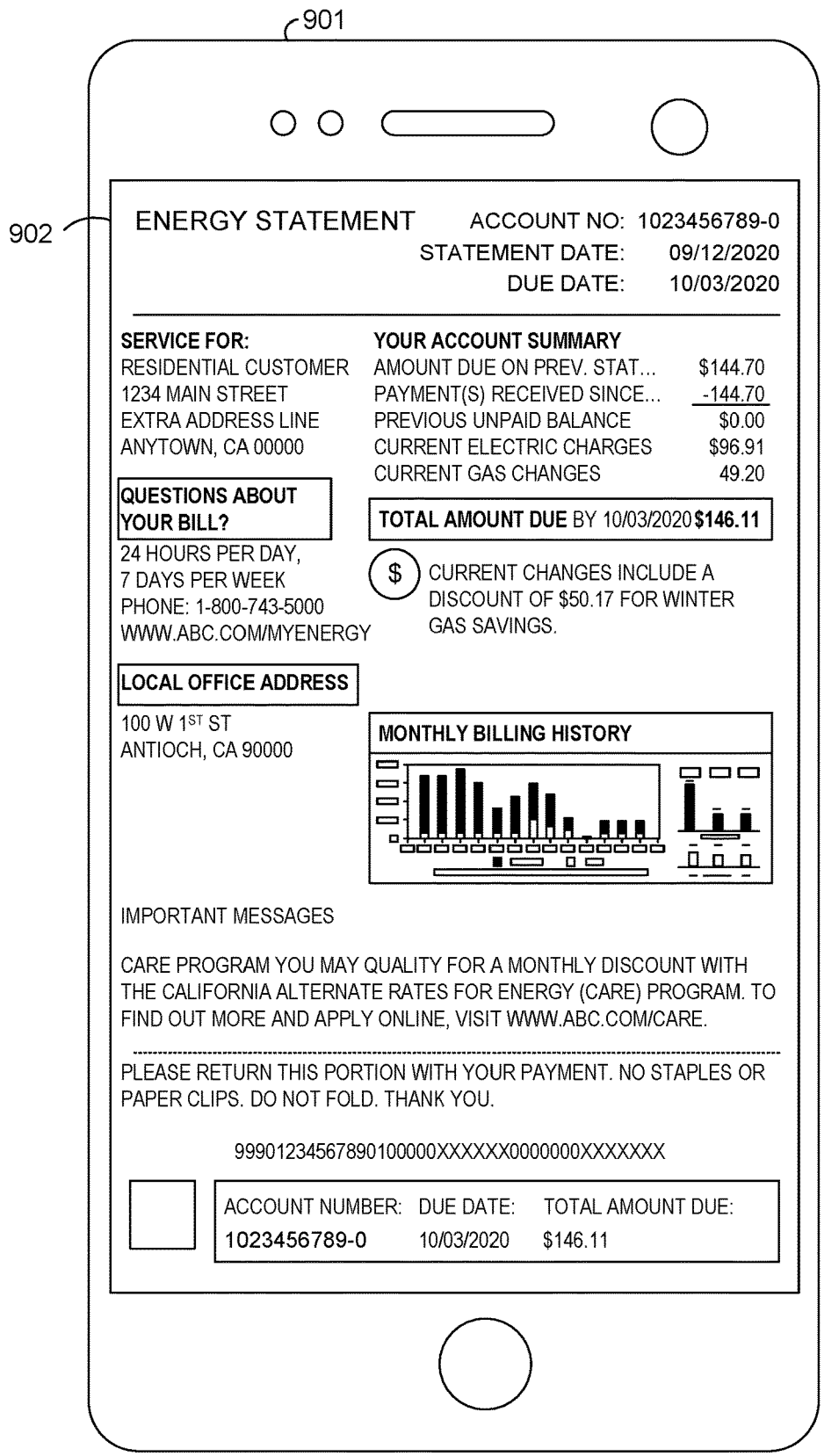
FIG. 9 illustrates two screenshot of an example user interface on a mobile device, according to some embodiments.
Figure 9:
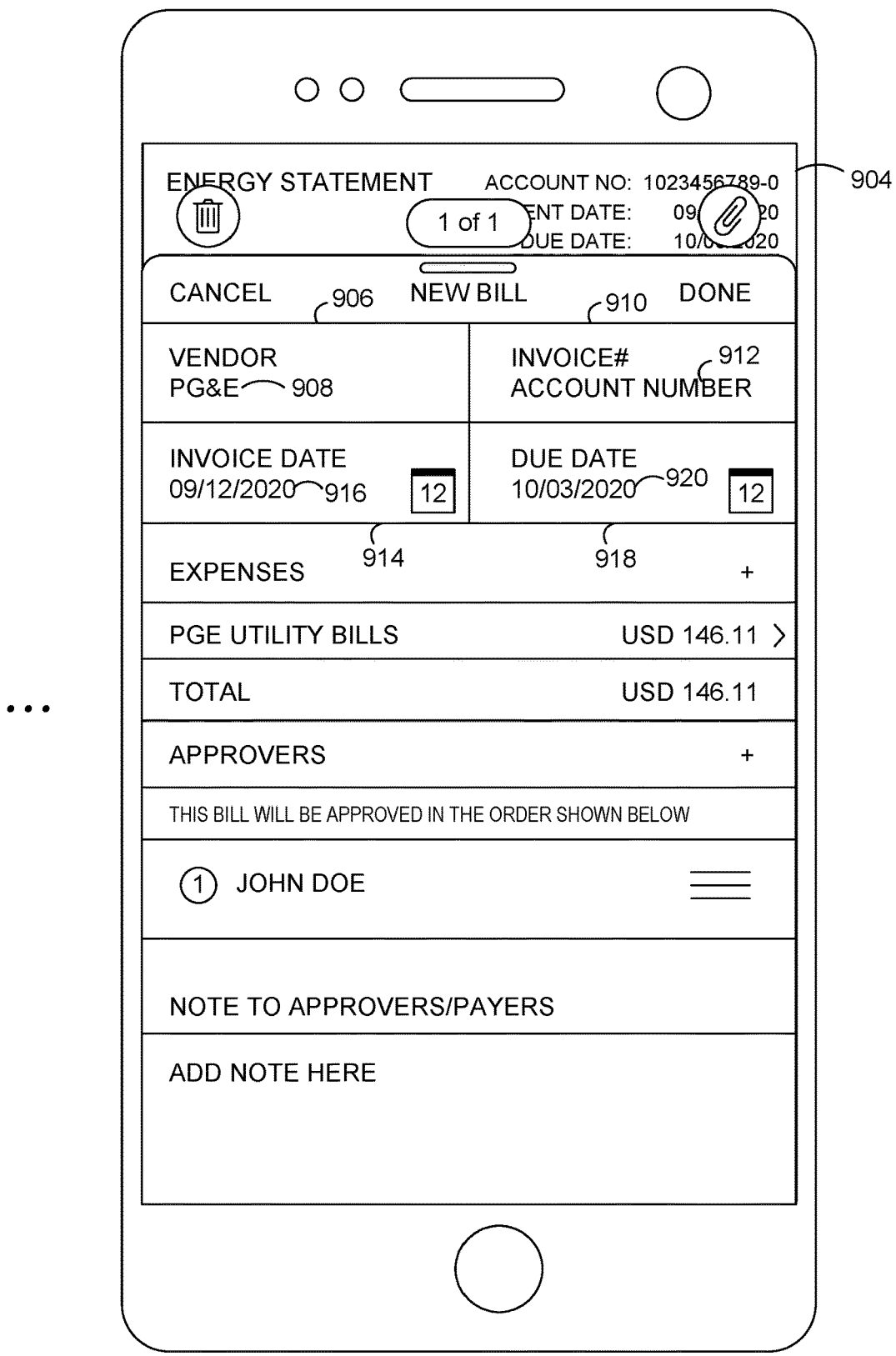

FIG. 9 illustrates two screenshot 902 and 904 of an example user interface on a mobile device 901, according to some embodiments. In some embodiments, the screenshot 904 represents the output of the inference component 114 or what is produced by the presentation component 116 of FIG. 1. FIG. 9 illustrates that a user can easily pay a utility bill using the screenshot 904 based on extracting information and processing the invoice indicated in the screenshot 902 (e.g., as performed by the document conversion module 102, the object recognition component 104, the pre-processing module 106, the context/question/answer pair generator 112, the inference component 114 and the presentation component 116).

As illustrated in the screenshot 904 particular embodiments automatically populate various fields (without manual user input) in response to processing (e.g., by the components of FIG. 1) the utility bill invoice. For example, particular embodiments automatically populate the "vendor" field 906 with the prediction or value "PG&E" (e.g., as determined by the answer generator 114-1). In some embodiments, this is the answer to the example question of "which company does this invoice come from?" In some embodiments, in response to receiving an indication that the user has clicked the field 905 or corresponding value 908 (or any other fields/values located in the screenshot 904), particular embodiments automatically switch pages to the screenshot 902 and/or otherwise indicate at the screenshot 902 where the corresponding prediction value is located (e.g., as determined by the answer location generator 114-2) in the particular bill. For example, in response to receiving an indication that the user has clicked the "invoice#" indicia of the field 910, embodiments cause display of the number 1, as indicated next to the "account No." text within the screenshot 902. In this way, embodiments assist users in indicating where the predictions were derived from within the bill.

As further illustrated in FIG. 9, particular embodiments automatically populate the "invoice #" field 910 with the value of "account number" 912 (which is generically represented, but may contain an actual account number). Such population may be in response to answering the question, "what is the account number?" Particular embodiments also automatically populate the "invoice date field" 914 with the value "09/12/2013" 916. Such population may be in response to answering the question, "What is the invoice date?" Particular embodiments automatically populate the "due date" field [920] 918 with the value of "10/03/2013" 920. Such population may be in response to answer the question, "when is the bill due?" Some embodiments automatically populate these fields at the screenshot 904 so that users can automatically pay the bill at the screenshot 904 (or another page), which would not otherwise occur at the static image of the bill included in the screenshot 902.

Figure 10:
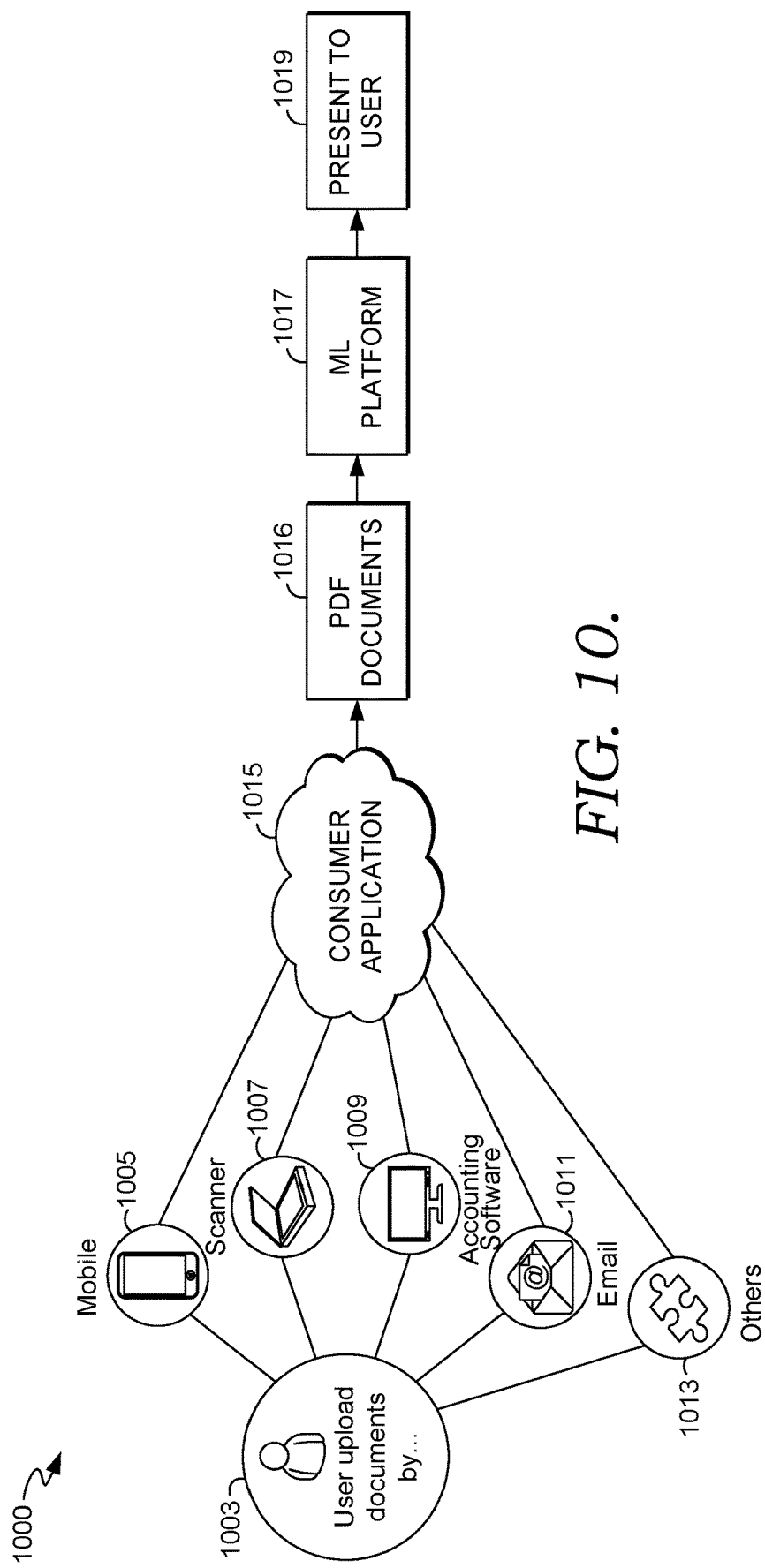
FIG. 10 is a schematic diagram of a system illustrating document extraction, according to some embodiments.

FIG. 10 is a schematic diagram of a system 1000 illustrating document extraction, according to some embodiments. In some embodiments, the system 1000 is included in in the system 100 of FIG. 1. At a first time, the consumer application inbox 1015 receives one or more user uploaded documents 1003 via a mobile device 1005 (based on a user taking a picture of a document), a scanner 1007, accounting software APIs 1009 (e.g., using a web application or app), email 1011, and/or any other suitable method 1013 (e.g., via a smartwatch, sensor, etc.). Accordingly, a user (e.g., an accountant, bookkeeper, clerk, audit, or any authorized employee) can upload, for example, a payment document into the consumer application inbox 1015 (e.g., Bill.com inbox system). Such uploaded format can be TIFF, PNG, JPEG, or JPG, for example.

In some embodiments, in response to the one or more documents having been uploaded, various embodiments extract metadata from the document, as well as device/user fingerprint information. Some embodiments, convert (e.g., via the document conversion module 102) the uploaded documents into the PDF documents 1016 (if not already in PDF format). Some embodiments additionally associate each document with a unique document ID, which can be used for record keeping. After completion of the document ID generation, various embodiments send the PDF documents 1016 to the ML platform 1017. The ML platform is generally responsible for processing the PDF documents 1016 via one or more machine learning models. In some embodiments, the ML platform 1017 includes the object recognition component 104, the pre-processing module 106, the pre-training component 108, the context/question/answer pair generator 112, the fine-tuning component 113, and/or the inference component 114 of FIG. 1, in order to generate one or more answers to questions and indicate the location of the answers on the documents 1016. In response to the ML platform 1017 performing its functionality, information is presented to the user via 1019. For example, FIGS. 7, 8, and 9 describe information that can be presented to the user.

Figure 11:
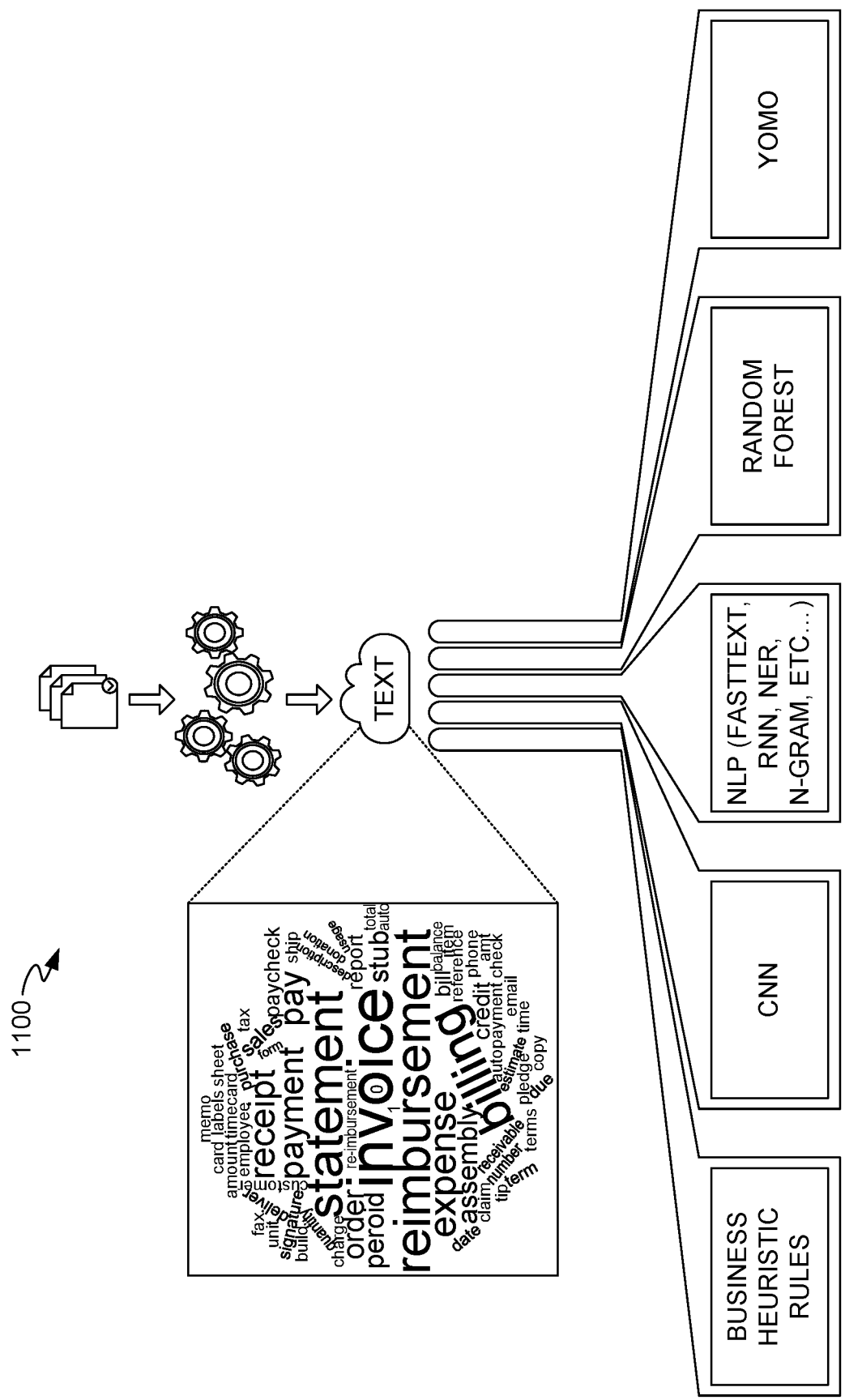
FIG. 11 is a schematic diagram illustrating details of a machine learning pipeline, according to some embodiments.

FIG. 11 is a schematic diagram illustrating details of a machine learning pipeline 1100, according to some embodiments. In some embodiments, the machine learning (ML) pipeline 1100 includes the steps taken by the ML platform 1017 of FIG. 10. In some embodiments, the ML pipeline 1100 is included in the system 100 of FIG. 1 and/or the system 1000 of FIG. 10.

In some embodiments, the ML pipeline 1100 is triggered by any PDF input at step one. The PDF is then sent to the OCR engine (e.g., as described with respect to the object recognition component 104 of FIG. 1) at step 2. At step 3, the OCR engine returns a JSON containing the words position related information of each word. The JSON output also contains larger semantic structures (e.g., phrases, paragraphs, blocks) as well as smaller segments, such as letters and break types (e.g., spaces, tabs, etc.). This output JSON is also the input for one or more machine learning models for fine-tuning at step 4, which can use different structures. In some embodiments, the fine-tuning at step 4 includes the functionality of the fine-tuning component 113 at FIG. 1. Typically, words such as "invoice," "reimbursement," "receipt," "bill," "due," and "pay," can be observed with much higher frequency than others. Here, business rule-based heuristics have been applied to identify labels for fields, such as invoice number, invoice date, and amount, for example. This process may include the words and their relative positions (e.g., block numbers, line numbers, and the like). These models can use different sematic structures including phrases, blocks, and words in the JSON output.

Figure 12:
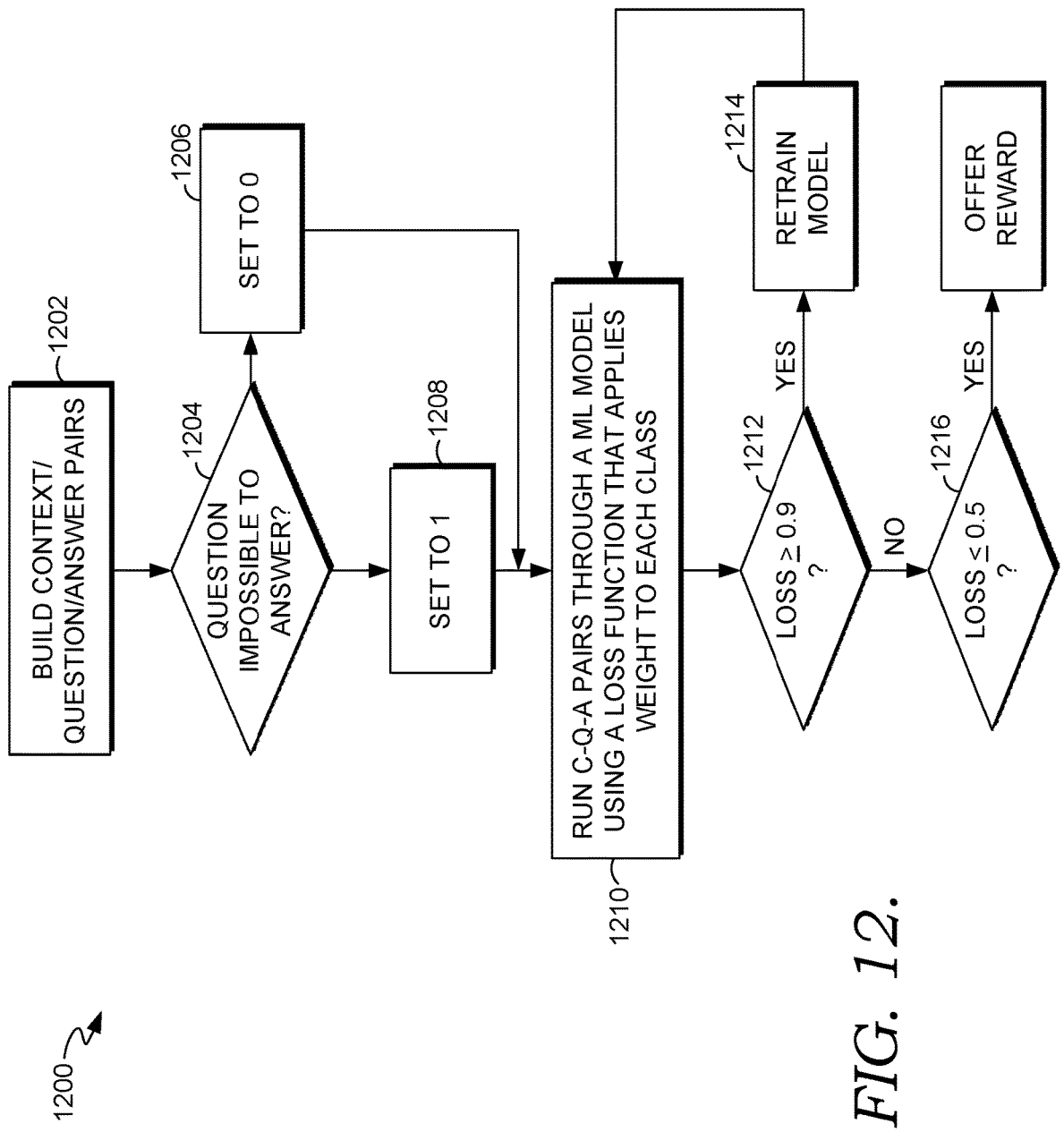
FIG. 12 is a flow diagram of an example process for fine-tuning a machine learning model, according to some embodiments.

FIG. 12 is a flow diagram of an example process 1200 for fine-tuning a machine learning model, according to some embodiments. In some embodiments, the process 1200 is performed by the fine-tuning component 113 of FIG. 1. The process 1200 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 11). The computer-implemented method, the system (that includes at least one computing device having at least one processor and at least one computer readable storage medium), and/or the computer readable medium as described herein may perform or be caused to perform the process 800 or any other functionality described herein.

Per block 1202, particular embodiments build context-question-answer (C-Q-A) pairs, as described, for example, with respect to the context, question, and/or answer generator 112 of FIG. 1. In some embodiments, the process 1200 includes functionality performed by the document conversion module 102, the object recognition component 104, the pre-processing module 106, and/or the pre-training component 108 of FIG. 1. In some embodiments, the context is derived from user-identified documents. In this way, there are no third-party labelling requirements to represent the ground truth. In various embodiments, "user-identified documents" are those documents explicitly or implicitly defined by users instead of third parties (e.g., subject matter experts or programmers). For example, instead of a programmer labelling a document as belonging to or being sent by entity A, a user may indicate that the document belongs to entity A in the course of regular business transactions, such as sending (or paying) invoices.

Per block 1204, it is determined whether one or more questions are impossible to answer. Questions are impossible to answer, for example, when the ground truth (or answers) are not in the context. For example, a question may be "what is the date of the invoice?" but the invoice may inadvertently not have included a date. Per block 1206, if the question is impossible to answer, then a value is set to 0 (or TRUE). This flag is used in order for the machine learning model to skip this step at the next training phase or epoch to speed up training. Per block 1208, if the question is not impossible to answer, then particular embodiments set the value to 1 (or FALSE).

Per block 1210, some embodiments run the C-Q-A pairs through one or more machine learning models using a loss function that applies a weight to each class. The loss function used in BERT does not apply weight to each class. Conversely, various embodiments pre-compute the global distribution of each class and assign prior-weights to them. In this context, a Weights are a list of floats which represents the frequency of answer words and other non-answer words. Next various embodiments convert the weights to tensors to fit the computation graph running on GPU class_weights=torch.FloatTensor(weights).cuda( )
The loss can be described as:

$$\text{loss}(x, \text{class}) = -\log\left(\frac{\exp(x[\text{class}])}{\sum_j \exp(x[j])}\right) = -x[\text{class}] + \log\left(\sum_j \exp(x[j])\right)$$

or in the case of the weight argument being specified:

$$\text{loss}(x, \text{class}) = \text{weight}[\text{class}]\left(-x[\text{class}] + \log\left(\sum_j \exp(x[j])\right)\right)$$

The losses are averaged across observations for each mini-batch. If the weight argument is specified then this is a weighted average:

$$\text{loss} = \frac{\sum_{i=1}^{N} \text{loss}(i, \text{class}[i])}{\sum_{i=1}^{N} \text{weight}[\text{class}[i]]} \quad (\#6)$$

Various existing models do not consider these types of weights in training and assume all tokens shared the same distribution. By adding these predefined weights, it helps training to reach a global optimal solution faster relative to existing technologies.

Per block 1212, it is determined whether the loss is less than or equal to 0.9. Per block 1214, if the loss is greater than or equal to 0.9, the one or more machine learning models are retrained using the loss function at block 1210. Some embodiments additionally reset this value as 1, meaning training accuracy on this batch is totally not acceptable and embodiments force the model to retrain it. Per block 1216, if the loss is not greater than or equal to 0.9, embodiments determine if the loss is less than or equal to 0.5, if yes, embodiments offer a reward (e.g., via reinforcement training). For example, some embodiments, can reset the value to 0.01, meaning embodiments would reward training on this batch data and speed up the process to reach the global optimal solution.

Figure 13:
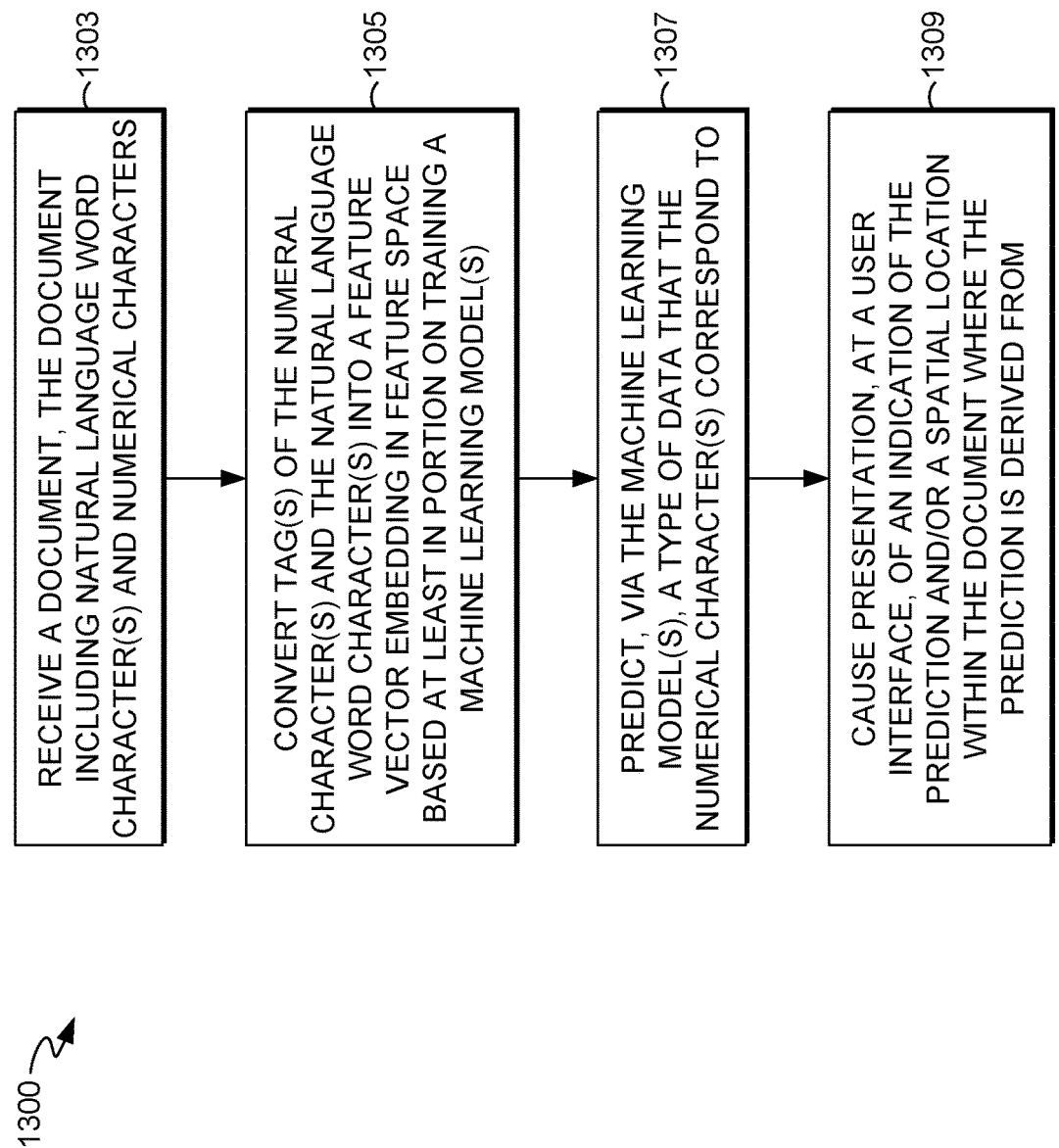
FIG. 13 is a flow diagram of an example process for predicting, via one or more machine learning models, a type of data that one or more numerical characters correspond to, according to some embodiments.

FIG. 13 is a flow diagram of an example process 1300 for predicting, via one or more machine learning models, a type of data that one or more numerical characters correspond to, according to some embodiments. Per block 1303, a document is received, where the document includes one or more natural language word characters (e.g., letters, words, sentences, paragraphs, etc.) and one or more numerical characters. A "numerical character" refers to any number and/or sign (e.g., 4, %, #) associated with a number, such as an integer, float, whole numbers, and/or any other real numbers. In some embodiments, the document is a financial document, such as an invoice, bill, a balance sheet (summary of balances of an entity or person), an income statement (indicates how revenue is transformed into net income or profit), a tax document, a cash flow statement (shows how changes in balance sheet accounts and income affect cash and cash equivalents), or a statement of changes in equity. Examples of invoices are described with respect to the invoice 700 of FIG. 7 and the invoice 801 of FIG. 8. An example of a bill is described with respect to the screenshot 902 of FIG. 9. In some embodiments, the document need not be a financial document but can be any document that contains one or more numerical characters, such as an email message, a blog post, a spreadsheet page, and the like.

In some embodiments, the document is an invoice, and the one or more questions are derived from a group of questions consisting of: "what is the total amount of the invoice?" "what is the invoice number of the invoice?" which company does this invoice come from?" what is the invoice date of this invoice? And "what is the payment due date for this invoice?" Examples of these questions are described with respect to the context/question/answer pair generator 1112.

Per block 1305, some embodiments convert one or more tags of the one or more numerical characters and the one or more natural word characters into a feature vector embedding in feature space based at least in part on training one or more machine learning models. Examples of this are described with respect to FIG. 3, FIG. 4, FIG. 5, and FIG. 6, as well as the inference component 114 and the fine tuning component 113 of FIG. 1. In some embodiments, prior to the converting, the one or more tags can first be generated, where the one or more tags indicate, in natural language, a category that the one or more numerical characters belong to. Examples of generating tags are described with respect to the number-text tagger 106-4. For instance, some embodiments can generate a tag "currency" in response to processing the numerical sequence "$135.50," which indicates that this number value belongs to a "currency" category, as opposed to, for example, a "date." In some embodiments, where one or more questions are derived in Question Answering systems, particular embodiments further convert the one or more questions into the feature vector embedding. In some embodiments, block 1305 includes converting an indication of the one or more numerical characters into the feature vector embedding. Such "indication" can be the numerical characters themselves and/or any sign associated with the numerical characters, such as $, %, and the like.

In some embodiments, the one or more machine learning models used at 1305 includes a modified Bidirectional Encoder Representations from Transformers (BERT) model that applies a weight to each class for a loss function, as described for example with respect to block 1210 of FIG. 12. In some embodiments, the training of these one or more machine learning models is performed based at least in part on applying one or more predefined weights to one or more classes, where the one or more predefined weights correspond to a frequency of answers and other non-answers, as described, for example with respect to block 1210 of FIG. 12. In some embodiments, the training includes pre-training the machine learning model based on compressing a first version of the machine learning model into a smaller second version of the machine learning model. Examples of this are described with respect to the knowledge distillation component 108-1 of FIG. 1.

Per block 1307, particular embodiments predict, via the one or more machine learning models, a type of data that the one or more numerical characters correspond to. Examples of this are described with respect to the inference component 114 of FIG. 1. In an illustrative example of block 1307, particular embodiments predict, via the one or more machine learning models, one or more answers to the one or more questions based on the converting. The one or more answers can be included in at least one of: the one or more natural language characters and the one or more numerical characters. For instance, some embodiments can predict that the answer to "what is the total amount of the invoice?" is $113. In some embodiments, the predicting is based at least in part on a coordinate position of the one or more natural language word characters or the numerical characters within the document. For example, a page number may always be located at a footer portion of a document for a particular client. Machine learning models can learn this pattern and predict at a later time that any numerical value that occurs in the same position in the header refers to a particular page number answer.

Per block 1309, some embodiments cause presentation, at a user interface, of an indication of the prediction and/or a spatial location within the document where the prediction is derived from. Examples of block 1309 are described with respect to FIG. 7 and FIG. 8. For example, with respect to FIG. 7, an indication of the prediction, the prediction of "due date" as indicated in the field 718 is "01/12/16." Further an example of an indication of the spatial location where the prediction is derived from is illustrated by the bounding box 710 and the arrow 712.

In some embodiments, the causing presentation of the spatial location is based at least in part on using a computer-vision-based machine learning model, as described, for example, with respect to the object recognition component 104 that uses a CNN and bounding box to locate the coordinates of objects. In some embodiments, block 1309 includes automatically populating one or more fields at the user interface (e.g., with one or more answers based on the predicting). For example, referring back to FIG. 9, in response to the predicting, embodiments can automatically populate the "invoice date" field with the value "09/12/2013."

Figure 14:
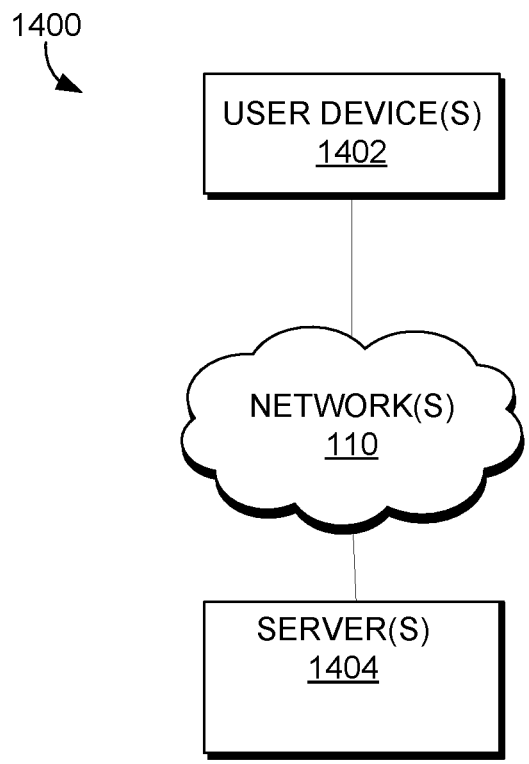
FIG. 14 is a block diagram of a computing environment in which aspects of the present technology are implemented within, according to some embodiments.

FIG. 14 is a block diagram of a computing environment 1400 in which aspects of the present disclosure are employed in, according to certain embodiments. Although the environment 1400 illustrates specific components at a specific quantity, it is recognized that more or less components may be included in the computing environment 1400. For example, in some embodiments, there are multiple user devices 1402 and multiple servers 1404, such as nodes in a cloud or distributing computing environment. In some embodiments, some or each of the components of the system 100 of FIG. 1 are hosted in the one or more servers 1404. In some embodiments, the user device(s) 1402 and/or the server(s) 1404 may be embodied in any physical hardware, such as the computing device 1500 of FIG. 15.

The one or more user devices 1402 are communicatively coupled to the server(s) 1404 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 1404 and the user devices 1402.

In some embodiments, a user issues a query on the one or more user devices 1402, after which the user device(s) 1402 communicate, via the network(s) 110, to the one or more servers 1404 and the one or more servers 1404 executes the query (e.g., via one or more components of FIG. 1) and causes or provides for display information back to the user device(s) 1402. For example, the user may issue a query at the user device 1402 that is indicative of an upload request to upload a document. Responsively, the server(s) 1404 can perform functionality as described with respect to FIG. 1 and provide output similar to FIG. 7, FIG. 8, and/or FIG. 9.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 15, computing device 1500 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 1500 represents the physical embodiments of one or more systems and/or components described above. For example, the computing device 1500 can represent: the one or more user devices 1402, and/or the server(s) 1404 of FIG. 14. The computing device 1500 can also perform some or each of the blocks in the process 1200, 1300, and/or any functionality described herein with respect to FIGS. 1-13. It is understood that the computing device 1500 is not to be construed necessarily as a generic computer that performs generic functions. Rather, the computing device 1500 in some embodiments is a particular machine or special-purpose computer. For example, in some embodiments, the computing device 1500 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 800 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1500. The computing device 1500 may be equipped with depth cameras, such as, stereoscopic camera systems, infrared camera systems, RGB camera systems, and combinations of these for gesture detection and recognition. Additionally, the computing device 1500 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
   one or more processors; and
   computer storage memory having computer-executable instructions stored thereon which, when executed by the one or more processors, implement a method comprising:
   receiving a document represented by a plurality of blocks, the document including natural language characters that include natural language word characters and numerical characters;
   in response to the receiving of the document, automatically clustering, via a distance measure, each natural language character, of the natural language characters, into a respective block of the plurality of blocks, wherein the blocks are graphical elements having a geometric shape;
   in response to the clustering and based on corresponding X and Y coordinates of the natural language characters, sorting the natural language characters within each block;
   based at least in part on the clustering and the sorting of each natural language character, automatically generating, via Natural Language Processing (NLP) and program rules, one or more tags next to the one or more numerical characters in the document, the one or more tags indicate, in natural language, a category that the one or more numerical characters belong to;
   deriving one or more questions;
   converting the one or more tags, the one or more natural language word characters, and the one or more questions into a feature vector embedding in feature space based at least in part on training one or more machine learning models;
   based at least in part on the clustering, and the sorting, for each word and number, generate, via the one or more machine learning models, an attention vector, the attention vector captures a contextual relationship between other words and numbers in a same block and line as the word and number;
   based at least in part on the generating of the attention vector, predicting, via the one or more machine learning models, one or more answers to the one or more questions, the one or more answers being included in at least the one or more numerical characters; and
   based at least in part on the predicting of the one or more answers to the one or more questions, causing presentation, at a user interface, of an indication of the one or more answers and a spatial location within the document where the one or more answers are derived from.

2. The system of claim 1, wherein the causing presentation of the spatial location is based at least in part on using a computer-vision-based machine learning model.

3. The system of claim 1, wherein the one or more machine learning models includes a modified Bidirectional Encoder Representations from Transformers (BERT) model that applies a weight to each class for a loss function.

4. The system of claim 1, wherein the document is a financial document from a group of financial documents consisting of: an invoice, a bill, a balance sheet, an income statement, a tax document, a cash flow statement, and a statement of changes in equity.

5. The system of claim 1, wherein the method of the system further comprises, automatically populating one or more fields at the user interface with the one or more answers based on the predicting.

6. The system of claim 1, wherein the predicting of the one or more answers included in the one or more numerical characters is based at least in part on a coordinate position of the one or more numerical characters within the document.

7. The system of claim 1, wherein the training is performed based at least in part on applying one or more predefined weights to one or more classes, and wherein the one or more predefined weights correspond to a frequency of answers or other non-answers.

8. The system of claim 1, wherein the training includes pre-training the one or more machine learning models based on compressing a first version of the one or more machine learning models into a smaller second version of the one or more machine learning models.

9. The system of claim 1, wherein the document is an invoice, and wherein the one or more questions are derived from a group of questions consisting of: ?" "which company does this invoice come from?" and "what is the payment due date for this invoice?".

10. A computer-implemented method comprising:
receiving a document, the document including one or more natural language word characters and one or more numerical characters;
detecting, via computer vision functionality, a plurality of blocks in the document, each block, of the plurality of blocks, being a graphical element having a geometric shape;
automatically generating at least one tag next to the one or more numerical characters in the document and convert the one or more numerical characters into one or more words that recite the one or more numerical characters, the at least one tag indicating, in natural language, a category that the one or more numerical characters belong to, the at least one tag being included among one or more tags;
detecting a coordinate position of the one or more numerical characters within the document;
based at least in part on the automatic generating of the at least one tag next to the one or more numerical characters in the document, the converting of the one or more numerical characters into the one or more words, the detecting of the coordinate position of the one or more numerical characters within the document, and the detecting of the plurality of blocks in the document, predicting, via the one or more machine learning models, a type of data that the one or more numerical characters correspond to; and
based at least in part on the predicting, causing presentation, at a user interface, of at least one of: an indication of the prediction and a spatial location within the document where the prediction is derived from.

11. The computer-implemented method of claim 10, wherein the causing presentation of the spatial location is based at least in part on using a computer-vision-based machine learning model.

12. The computer-implemented method of claim 10, wherein the one or more machine learning models includes a modified Bidirectional Encoder Representations from Transformers (BERT) model that applies a weight to each class for a loss function.

13. The computer-implemented method of claim 10, wherein the document is a financial document from a group of financial documents consisting of: an invoice, a bill, a balance sheet, an income statement, a tax document, a cash flow statement, and a statement of changes in equity.

14. The computer-implemented method of claim 10, further comprising automatically populating one or more fields at the user interface with one or more answers based on the predicting.

15. The computer-implemented method of claim 10, wherein the training is performed based at least in part on applying one or more predefined weights to one or more classes, and wherein the one or more predefined weights correspond to a frequency of answers or other non-answers.

16. The computer-implemented method of claim 10, wherein the predicting is based on using a Question Answering system.

17. The system of claim 1, wherein the document is an invoice, and wherein the one or more questions are derived from a group of questions consisting of: "what is the total amount of the invoice?" "what is the invoice number of the invoice?" "which company does this invoice come from?" "what is the invoice date of this invoice?" and "what is the payment due date for this invoice?".

18. One or more computer storage media having computer-executable instructions embodied thereon that, when executed, by one or more processors, cause the one or more processors to perform a method, the method comprising:
receiving a document, the document including one or more numerical characters;
in response to the receiving of the document, detecting, via computer vision functionality, a plurality of blocks in the document, each block, of the plurality of blocks, being a graphical element having a geometric shape;
based at least in part on the detecting of the plurality of blocks, automatically generating, via at least one of, Natural Language Processing (NLP) or program rules, at least one tag next to the one or more numerical characters in the document, the at least one tag indicating, in natural language, a category that the one or more numerical characters belong to;
converting an indication of the one or more numerical characters into a feature vector embedding in feature space based at least in part on training one or more machine learning models;
based at least in part on the detecting of the plurality of blocks, and the automatic generating, via at least one of, NLP or program rules, the at least one tag next to the one or more numerical characters, predicting, via the one or more machine learning models, a type of data that the one or more numerical characters correspond to; and
based at least in part on the predicting, causing presentation, at a user interface, of at least one of: the prediction and a spatial location within the document where the prediction is derived from.

19. The one or more computer storage media of claim 18, wherein the document is a financial document from a group of financial documents consisting of: an invoice, a bill, a balance sheet, an income statement, a tax document, a cash flow statement, and a statement of changes in equity.

20. The system of claim 1, wherein the method of the system further comprises:
generating a context-question-answer pair, the generating includes populating a data structure with a question, listing each candidate answer to the question, and associating a block of text in a training document to the question;
in response to the generating of the context-question-answer pair, determining whether the question is impossible to answer;

at least partially responsive to determining that the question is not impossible to answer, training a machine learning model by running the context-question-answer pair through the machine learning model and computing a loss function that applies one or more predefined weights to one or more prediction classes, wherein the one or more predefined weights correspond to a frequency of answers to the question and a frequency of other non-answers to the question; and wherein the predicting, via the machine learning model, one or more answers to the one or more questions is further based on the question-context-answer pair, and the computing of the loss function that applies one or more predefined weight to one or more prediction classes.

* * * * *